United States Patent
Alugupalli et al.

(10) Patent No.: US 12,440,501 B2
(45) Date of Patent: Oct. 14, 2025

(54) CANNABINOID COMPOSITIONS AND METHODS OF USE THEREOF FOR IMMUNE MODULATION

(71) Applicant: SRIN Therapeutics, Inc., Horsham, PA (US)

(72) Inventors: Akhil Alugupalli, Horsham, PA (US); Kishore Alugupalli, Horsham, PA (US)

(73) Assignee: SRIN Therapeutics, Inc., Horsham, PA (US)

( * ) Notice: Subject to any disclaimer, the term of this patent is extended or adjusted under 35 U.S.C. 154(b) by 934 days.

(21) Appl. No.: 17/428,572

(22) PCT Filed: Feb. 7, 2020

(86) PCT No.: PCT/US2020/017311
§ 371 (c)(1),
(2) Date: Aug. 4, 2021

(87) PCT Pub. No.: WO2020/163775
PCT Pub. Date: Aug. 13, 2020

(65) Prior Publication Data
US 2022/0193003 A1  Jun. 23, 2022

Related U.S. Application Data

(60) Provisional application No. 62/802,754, filed on Feb. 8, 2019.

(51) Int. Cl.
| | | |
|---|---|---|
| A61K 31/05 | (2006.01) | |
| A61K 9/00 | (2006.01) | |
| A61K 9/107 | (2006.01) | |
| A61K 31/282 | (2006.01) | |
| A61K 31/4184 | (2006.01) | |
| A61K 31/437 | (2006.01) | |
| A61K 31/4523 | (2006.01) | |
| A61K 31/506 | (2006.01) | |
| A61K 31/519 | (2006.01) | |
| A61K 31/655 | (2006.01) | |
| A61K 31/704 | (2006.01) | |
| A61K 35/17 | (2025.01) | |
| A61K 39/00 | (2006.01) | |
| A61K 39/395 | (2006.01) | |
| A61K 47/06 | (2006.01) | |
| A61K 47/10 | (2017.01) | |
| A61K 47/26 | (2006.01) | |
| A61K 47/44 | (2017.01) | |
| A61P 35/00 | (2006.01) | |

(52) U.S. Cl.
CPC ............ *A61K 31/05* (2013.01); *A61K 9/0019* (2013.01); *A61K 9/1075* (2013.01); *A61K 31/282* (2013.01); *A61K 31/4184* (2013.01); *A61K 31/437* (2013.01); *A61K 31/4523* (2013.01); *A61K 31/506* (2013.01); *A61K 31/519* (2013.01); *A61K 31/655* (2013.01); *A61K 31/704* (2013.01); *A61K 35/17* (2013.01); *A61K 39/0011* (2013.01); *A61K 39/3955* (2013.01); *A61K 47/06* (2013.01); *A61K 47/10* (2013.01); *A61K 47/26* (2013.01); *A61K 47/44* (2013.01); *A61P 35/00* (2018.01); *A61K 2039/505* (2013.01); *A61K 2039/545* (2013.01)

(58) Field of Classification Search
CPC .............. A61K 31/4184; A61K 31/519; A61K 31/704; A61K 35/17; A61K 39/0011; A61K 39/3955; A61K 47/06; A61K 47/10; A61K 47/26; A61K 47/44; A61K 2039/505; A61K 2039/545; A61P 35/00
See application file for complete search history.

(56) References Cited

U.S. PATENT DOCUMENTS

| | | |
|---|---|---|
| 8,632,825 B2 | 1/2014 | Velasco Diez et al. |
| 2015/0080265 A1 | 3/2015 | Elzinga et al. |
| 2016/0279073 A1* | 9/2016 | Donsky ............... A61K 9/1617 |
| 2016/0331720 A1 | 11/2016 | Hospodor |
| 2018/0296493 A1 | 10/2018 | Kaufman |

FOREIGN PATENT DOCUMENTS

| | | |
|---|---|---|
| CA | 3068383 A1 | 1/2019 |
| GB | 2386322 | 9/2003 |
| WO | WO 2001/095899 | 12/2001 |
| WO | WO 2003/063847 | 8/2003 |
| WO | WO 2003/070232 | 8/2003 |
| WO | WO 2009/147439 | 12/2009 |
| WO | WO 2015/184127 | 12/2015 |
| WO | WO 2017/068349 | 4/2017 |

OTHER PUBLICATIONS

Rock, Front Pharmacol, 2016, 7:221 (Year: 2016).*
Pisanti, Pharmacology and Therapeutics, 175, 2017, 133-150, of the record (Year: 2017).*
Salminen, Cell. Mol. Life Sci. 65, 2008, 2979-2999 (Year: 2008).*
De la Ossa, Journal of Controlled Release 161, 2012 (Year: 2012).*
Choi, Biomolecules and Therapeutics, 16, 87-94, 2008 (Year: 2008).*
He, Journal of Nutrition, vol. 127, Iss. 5, 1997 (Year: 1997).*
Obembe, BJMMR, 7(1): 52-60, 2015 (Year: 2015).*
Abel, A.M. et al., Natural Killer Cells: Development, Maturation, and Clinical Utilization, Front Immunol. Aug. 13, 2018;9:1869.

(Continued)

*Primary Examiner* — Jeffrey H Murray
*Assistant Examiner* — Luisalberto Gonzalez
(74) *Attorney, Agent, or Firm* — Howson & Howson LLP

(57) ABSTRACT

Compositions comprising one or more phytocannabinoids and methods of use thereof for treatment of cancer, immune modulation, and protecting the immune system are provided.

20 Claims, 6 Drawing Sheets

(56) References Cited

OTHER PUBLICATIONS

Abrams, D.I., Integrating cannabis into clinical cancer care. Curr Oncol, May 2016. 23(2): p. S8-S14.
Abrams, D.I., Using Medical Cannabis in an Oncology Practice. Oncology (Williston Park), Mar. 2016. 30(5): p. 397-404.
Agata, Y., et al. Expression of the PD-1 antigen on the surface of stimulated mouse T and B lymphocytes. Int Immunol. May 1996;8(5):765-72.
Allegrezza, M.J., et al., IL15 Agonists Overcome the Immunosuppressive Effects of MEK Inhibitors. Cancer Res, May 2016. 76(9): p. 2561-72.
Armstrong, J.L., et al., Exploiting cannabinoid-induced cytotoxic autophagy to drive melanoma cell death. J Invest Dermatol, Jun. 2015. 135(6): p. 1629-1637.
Ascierto, P.A., et al., MEK162 for patients with advanced melanoma harbouring NRAS or Val600 BRAF mutations: a non-randomised, open-label phase 2 study. Lancet Oncol, Mar. 2013. 14(3): p. 249-56.
Basu, S. and B.N. Dittel, Unraveling the complexities of cannabinoid receptor 2 (CB2) immune regulation in health and disease. Immunol Res, Oct. 2011. 51(1): p. 26-38.
Basu, S., A. Ray, and B.N. Dittel, Cannabinoid Receptor 2 (CB2) Plays a Role in the Generation of Germinal Center and Memory B Cells, but Not in the Production of Antigen-Specific IgG and IgM, in Response to T-dependent Antigens. PLoS One, Jun. 2013. 8(6): p. e67587.
Basu, S., A. Ray, and B.N. Dittel, Cannabinoid receptor 2 is critical for the homing and retention of marginal zone B lineage cells and for efficient T-independent immune responses. J Immunol, Dec. 2011. 187(11): p. 5720-32.
Bennett, F. et al. Program death-1 engagement upon TCR activation has distinct effects on costimulation and cytokine-driven proliferation: attenuation of ICOS, IL-4, and IL-21, but not CD28, IL-7, and IL-15 responses. J Immunol. Jan. 15, 2003;170(2):711-8.
Brown, M. and Wittwer, C. Flow Cytometry: Principles and Clinical Applications in Hematology, Clin Chem. Aug. 2000;46(8 Pt 2):1221-9.
Campos, A.C., et al., Cannabidiol, neuroprotection and neuropsychiatric disorders. Pharmacol Res, Oct. 2016. 112: p. 119-127.
Carter, L. et al., PD-1:PD-L inhibitory pathway affects both CD4+ and CD8+ T cells and is overcome by IL-2. Eur J Immunol. Mar. 2002;32(3):634-43.
Catalanotti, F., et al., Phase II trial of MEK inhibitor selumetinib (AZD6244, ARRY-142886) in patients with BRAFV600E/K-mutated melanoma. Clin Cancer Res, Apr. 2013. 19(8): p. 2257-64.
Chou, T. et al. Quantitative analysis of dose-effect relationships: the combined effects of multiple drugs or enzyme inhibitors. Adv Enzyme Regul. 1984;22:27-55.
ClinicalTrials.gov. A Study: Pure CBD as Single-agent for Solid Tumor, NCT02255292. Oct. 2, 2014.
Cooper, Z.A., et al., Does It MEK a Difference? Understanding Immune Effects of Targeted Therapy. Clin Cancer Res, Jul. 2015. 21(14): p. 3102-4.
Crawford, J., D.C. Dale, and G.H. Lyman, Chemotherapy-induced neutropenia: risks, consequences, and new directions for its management. Cancer, Jan. 2004. 100(2): p. 228-37.
Crosby, T., et al., Systemic treatments for metastatic cutaneous melanoma. Cochrane Database Syst Rev, 2000(2): p. CD001215.
Damsky, W.E. and M. Bosenberg, From bedding to bedside: genetically engineered mouse models of cancer inform concurrent clinical trials. Pigment Cell Melanoma Res, Jul. 2012. 25(4): p. 404-5.
Deiana, S., et al., Plasma and brain pharmacokinetic profile of cannabidiol (CBD), cannabidivarine (CBDV), Delta(9)-tetrahydrocannabivarin (THCV) and cannabigerol (CBG) in rats and mice following oral and intraperitoneal administration and CBD action on obsessive-compulsive behaviour. Psychopharmacology (Berl), Feb. 2012. 219(3): p. 859-73.
Dong, H. et al. Tumor-associated B7-H1 promotes T-cell apoptosis: A potential mechanism of immune evasion. Nat Med. Aug. 2002;8(8):793-800.
Dushyanthen, S., et al., Agonist immunotherapy restores T cell function following MEK inhibition improving efficacy in breast cancer. Nat Commun, Sep. 2017. 8(1): p. 606.
Ebert, P.J.R., et al., MAP Kinase Inhibition Promotes T Cell and Anti-tumor Activity in Combination with PD-L1 Checkpoint Blockade. Immunity, Mar. 2016. 44(3): p. 609-621.
Eisenstein, T.K. and Meissler, J.J. Effects of Cannabinoids on T-cell Function and Resistance to Infection. J Neuroimmune Pharmacol. Jun. 2015;10(2):204-16.
Elbaz, M., et al., TRPV2 is a novel biomarker and therapeutic target in triple negative breast cancer. Oncotarget, May 2016. 9(71): p. 33459-33470.
Finak, G. et al. Standardizing Flow Cytometry Immunophenotyping Analysis from the Human ImmunoPhenotyping Consortium. Scientific reports vol. 6 20686 (Feb. 2016).
Freeman, G.J. et al. Engagement of the Pd-1 Immunoinhibitory Receptor by a Novel B7 Family Member Leads to Negative Regulation of Lymphocyte Activation. J Exp Med, Oct. 2, 2000; 192 (7): 1027-1034.
Galluzzi, L., et al., Immunological Effects of Conventional Chemotherapy and Targeted Anticancer Agents. Cancer Cell, Dec. 2015. 28(6): p. 690-714.
Hanus, L.O., Discovery and isolation of anandamide and other endocannabinoids. Chem Biodivers, Aug. 2007. 4(8): p. 1828-41.
Hartsough, E., Y. Shao, and A.E. Aplin, Resistance to RAF inhibitors revisited. J Invest Dermatol, Feb. 2014. 134(2): p. 319-325.
Haustein, M., et al., Cannabinoids increase lung cancer cell lysis by lymphokine-activated killer cells via upregulation of ICAM-1. Biochem Pharmacol, Nov. 2014. 92(2): p. 312-25.
Hershman, D.L., et al., Prevention and management of chemotherapy-induced peripheral neuropathy in survivors of adult cancers: American Society of Clinical Oncology clinical practice guideline. J Clin Oncol, Jun. 2014. 32(18): p. 1941-67.
Hu, G., G. Ren, and Y. Shi, The putative cannabinoid receptor GPR55 promotes cancer cell proliferation. Oncogene, Jan. 2011. 30(2): p. 139-41.
Hugo, W., et al., Non-genomic and Immune Evolution of Melanoma Acquiring MAPKi Resistance. Cell, Sep. 2015. 162(6): p. 1271-85.
Hu-Lieskovan, S., et al., Improved antitumor activity of immunotherapy with BRAF and MEK inhibitors in BRAF(V600E) melanoma. Sci Transl Med, Mar. 2015. 7(279): p. 279ra41.
Huncharek, M., J.F. Caubet, and R. McGarry, Single-agent DTIC versus combination chemotherapy with or without immunotherapy in metastatic melanoma: a meta-analysis of 3273 patients from 20 randomized trials. Melanoma Res, Feb. 2001. 11(1): p. 75-81.
Iffland, K. and F. Grotenhermen, An Update on Safety and Side Effects of Cannabidiol: A Review of Clinical Data and Relevant Animal Studies. Cannabis Cannabinoid Res, Jun. 2017. 2(1): p. 139-154.
Kaplan, et al. Evidence for cannabinoid receptor-dependent and -independent mechanisms of action in leukocytes. J Pharmacol Exp Ther. Sep. 2003;306(3):1077-85.
Kaplan, et al. The profile of immune modulation by cannabidiol (CBD) involves deregulation of nuclear factor of activated T cells (NFAT). Biochem Pharmacol. Sep. 15, 2008;76(6):726-37.
Kirkwood, J.M., et al., Immunotherapy of cancer in 2012. CA Cancer J Clin, Sep.-Oct. 2012. 62(5): p. 309-35.
Kirkwood, J.M., et al., Next generation of immunotherapy for melanoma. J Clin Oncol, Jul. 2008. 26(20): p. 3445-55.
Knight, D.A., et al., Host immunity contributes to the antimelanoma activity of BRAF inhibitors. J Clin Invest, Mar. 2013. 123(3): p. 1371-81.
Koya, R.C., et al., BRAF inhibitor vemurafenib improves the antitumor activity of adoptive cell immunotherapy. Cancer Res, Aug. 2012. 72(16): p. 3928-37.
Laprairie, R.B., et al., Cannabidiol is a negative allosteric modulator of the cannabinoid CB1 receptor. Br J Pharmacol, Oct. 2015. 172(20): p. 4790-805.
Larkin, J., et al., Combined Nivolumab and Ipilimumab or Monotherapy in Untreated Melanoma. N Engl J Med, Jul. 2015. 373(1): p. 23-34.
Larkin, J., et al., Combined vemurafenib and cobimetinib in BRAF-mutated melanoma. N Engl J Med, Nov. 2014. 371(20): p. 1867-76.

(56) References Cited

OTHER PUBLICATIONS

Levine, N. and E.S. Greenwald, Mucocutaneous side effects of cancer chemotherapy. Cancer Treat Rev, Jun. 1978. 5(2): p. 67-84.
Loprinzi, C.L., et al., Prevention and Management of Chemotherapy-Induced Peripheral Neuropathy in Survivors of Adult Cancers: ASCO Guideline Update. J Clin Oncol, Oct. 2020. 38(28): p. 3325-3348.
Maida, V. and P.J. Daeninck, A user's guide to cannabinoid therapies in oncology. Curr Oncol, Dec. 2016. 23(6): p. 398-406.
Massi, P., A. Vaccani, and D. Parolaro, Cannabinoids, immune system and cytokine network. Curr Pharm Des, 2006. 12(24): p. 3135-46.
Massi, P., et al., Antitumor effects of cannabidiol, a nonpsychoactive cannabinoid, on human glioma cell lines. J Pharmacol Exp Ther, Mar. 2004. 308(3): p. 838-45.
Massi, P., et al., The non-psychoactive cannabidiol triggers caspase activation and oxidative stress in human glioma cells. Cell Mol Life Sci, Sep. 2006. 63(17): p. 2057-66.
Mauch, P., et al., Hematopoietic stem cell compartment: acute and late effects of radiation therapy and chemotherapy. Int J Radiat Oncol Biol Phys, Mar. 1995. 31(5): p. 1319-39.
McAllister, S.D., et al., Cannabidiol as a novel inhibitor of Id-1 gene expression in aggressive breast cancer cells. Mol Cancer Ther, Nov. 2007. 6(11): p. 2921-7.
McAllister, S.D., et al., The Antitumor Activity of Plant-Derived Non-Psychoactive Cannabinoids. J Neuroimmune Pharmacol . Jun. 2015;10(2):255-67.
Mechoulam, R., L.A. Parker, and R. Gallily, Cannabidiol: an overview of some pharmacological aspects. J Clin Pharmacol, Nov. 2002. 42(S1): p. 11S-19S.
Mentzelopoulos, A., et al., Chemotherapy-Induced Brain Effects in Small-Cell Lung Cancer Patients: A Multimodal MRI Study. Brain Topogr, Mar. 2021. 34(2): p. 167-181.
Michaelis, M., et al., Differential effects of the oncogenic BRAF inhibitor PLX4032 (vemurafenib) and its progenitor PLX4720 on ABCB1 function. J Pharm Pharm Sci, Apr. 2014. 17(1): p. 154-68.
Millar, S.A., et al., A Systematic Review on the Pharmacokinetics of Cannabidiol in Humans. Front Pharmacol, Nov. 2018. 9: p. 1365.
Molyneux, G., et al., Haemotoxicity of busulphan, doxorubicin, cisplatin and cyclophosphamide in the female BALB/c mouse using a brief regimen of drug administration. Cell Biol Toxicol, Feb. 2011. 27(1): p. 13-40.
Muppidi, J.R., et al., Cannabinoid receptor 2 positions and retains marginal zone B cells within the splenic marginal zone. J Exp Med, Sep. 2011. 208(10): p. 1941-8.
Neurobiologix 'Pharmaceutical grade: What it is and how it benefits me' Jul. 21, 2018 (Jul. 21, 2018) retreived from <web.archive.org> on Apr. 8, 2020 (Apr. 8, 2020).
Nikiforov, Y.E., Thyroid carcinoma: molecular pathways and therapeutic targets. Mod Pathol, May 2008. 21 Suppl 2: p. S37-43.
Okazaki, T, Iwai Y, Honjo T. New regulatory co-receptors: inducible co-stimulator and PD-1. Curr Opin Immunol. Dec. 2002; 14(6):779-82.
Pisanti, S., et al., Cannabidiol: State of the art and new challenges for therapeutic applications. Pharmacol Ther, Jul. 2017. 175: p. 133-150.
Pond, S.M. and T.N. Tozer, First-pass elimination. Basic concepts and clinical consequences. Clin Pharmacokinet, Jan.-Feb. 1984. 9(1): p. 1-25.
Ramer, R., et al., Cannabidiol inhibits cancer cell invasion via upregulation of tissue inhibitor of matrix metalloproteinases-1. Biochem Pharmacol, Apr. 2010. 79(7): p. 955-66.
Ramer, R., et al., Cannabidiol inhibits lung cancer cell invasion and metastasis via intercellular adhesion molecule-1. FASEB J, Apr. 2012. 26(4): p. 1535-48.
Ramer, R., et al., COX-2 and PPAR-gamma confer cannabidiol-induced apoptosis of human lung cancer cells. Mol Cancer Ther, Jan. 2013. 12(1): p. 69-82.
Ramer, R., et al., Decrease of plasminogen activator inhibitor-1 may contribute to the anti-invasive action of cannabidiol on human lung cancer cells. Pharm Res, Oct. 2010. 27(10): p. 2162-74.
Rock, E.M. and L.A. Parker, Cannabinoids As Potential Treatment for Chemotherapy-Induced Nausea and Vomiting. Front Pharmacol, Jul. 2016. 7: p. 221.
Rowland, M., Influence of route of administration on drug availability. J Pharm Sci, Jan. 1972. 61(1): p. 70-4.
Russo, E.B., Taming THC: potential cannabis synergy and phytocannabinoid-terpenoid entourage effects. Br J Pharmacol, Aug. 2011. 163(7): p. 1344-64.
Schatz, A.R., et al., Cannabinoid receptors CB1 and CB2: a characterization of expression and adenylate cyclase modulation within the immune system. Toxicol Appl Pharmacol, Feb. 1997. 142(2): p. 278-87.
Sekhon, B. Surfactants: Pharmaceutical and Medicinal Aspects. Journal of Pharmaceutical Technology/ Research and Management, May 2013, vol. 1, pp. 43-68.
Shrivastava, A., et al., Cannabidiol induces programmed cell death in breast cancer cells by coordinating the cross-talk between apoptosis and autophagy. Mol Cancer Ther, Jul. 2011. 10(7): p. 1161-72.
Simkins, T.J., et al., Reduced Noradrenergic Signaling in the Spleen Capsule in the Absence of CB1 and CB2 Cannabinoid Receptors. J Neuroimmune Pharmacol, Dec. 2016. 11(4): p. 669-679.
Simmerman, E., et al., Cannabinoids as a Potential New and Novel Treatment for Melanoma: A Pilot Study in a Murine Model. J Surg Res, Mar. 2019. 235: p. 210-215.
Śledziński, P., et al. The current state and future perspectives of cannabinoids in cancer biology. Cancer Med. Mar. 2018;7(3):765-775. Epub Feb. 23, 2018.
Solinas, M., et al., Cannabidiol inhibits angiogenesis by multiple mechanisms. Br J Pharmacol, Nov. 2012. 167(6): p. 1218-31.
Su, Y., et al., RAF265 inhibits the growth of advanced human melanoma tumors. Clin Cancer Res, Aug. 2012. 18(8): p. 2184-98.
Sule-Suso, J., et al., Striking lung cancer response to self-administration of cannabidiol: A case report and literature review. SAGE Open Med Case Rep, Feb. 2019. 7: p. 2050313X19832160.
Thomas, A., et al., Cannabidiol displays unexpectedly high potency as an antagonist of CB1 and CB2 receptor agonists in vitro. Br J Pharmacol, Mar. 2007. 150(5): p. 613-23.
Vaccani, A., et al., Cannabidiol inhibits human glioma cell migration through a cannabinoid receptor-independent mechanism. Br J Pharmacol, Apr. 2005. 144(8): p. 1032-6.
Velasco, G., et al. Anticancer mechanisms of cannabinoids, Curr Oncol. Mar. 2016;23(2):S23-32.
Wang, D., et al., Clinical experience of MEK inhibitors in cancer therapy. Biochim Biophys Acta, Aug. 2007. 1773(8): p. 1248-55.
Wang, M., et al., Active immunotherapy of cancer with a nonreplicating recombinant fowlpox virus encoding a model tumor-associated antigen. J Immunol, May 1995. 154(9): p. 4685-92.
Wang, M., et al., Anti-tumor activity of cytotoxic T lymphocytes elicited with recombinant and synthetic forms of a model tumor-associated antigen. J Immunother Emphasis Tumor Immunol, Oct. 1995. 18(3): p. 139-46.
Ward, S.J., et al., Cannabidiol inhibits paclitaxel-induced neuropathic pain through 5-HT(1A) receptors without diminishing nervous system function or chemotherapy efficacy. Br J Pharmacol, Feb. 2014. 171(3): p. 636-45.
Weston, W.L., et al. Quantitative assays of human monocyte-macrophage function. J Immunol Methods. Sep. 1975;8(3):213-22.
Wikipedia 'Polysorbate 80' Dec. 3, 2018 (Dec. 3, 2018).
Wolchok, J.D., et al., Overall Survival with Combined Nivolumab and Ipilimumab in Advanced Melanoma. N Engl J Med, Oct. 2017. 377(14): p. 1345-1356.
Yang, Y.T. and J.P. Szaflarski, The US Food and Drug Administration's Authorization of the First Cannabis-Derived Pharmaceutical: Are We Out of the Haze? JAMA Neurol, Feb. 2019. 76(2): p. 135-136.
Yu, Y. et al. A Protocol for the Comprehensive Flow Cytometric Analysis of Immune Cells in Normal and Inflamed Murine Non-Lymphoid Tissues. PLoS One. Mar. 3, 2016;11(3):e0150606.

(56) References Cited

OTHER PUBLICATIONS

Zhou, X. et al. Conceptual and methodological issues relevant to cytokine and inflammatory marker measurements in clinical research. Curr Opin Clin Nutr Metab Care. Sep. 2010;13(5):541-7.
Zhu, W., et al., A mouse model for juvenile doxorubicin-induced cardiac dysfunction. Pediatr Res, Nov. 2008. 64(5): p. 488-94.
International Search Report and Written Opinion dated August Jul. 6, 2020 issued in International Patent Application No. PCT/US20/17311.

* cited by examiner

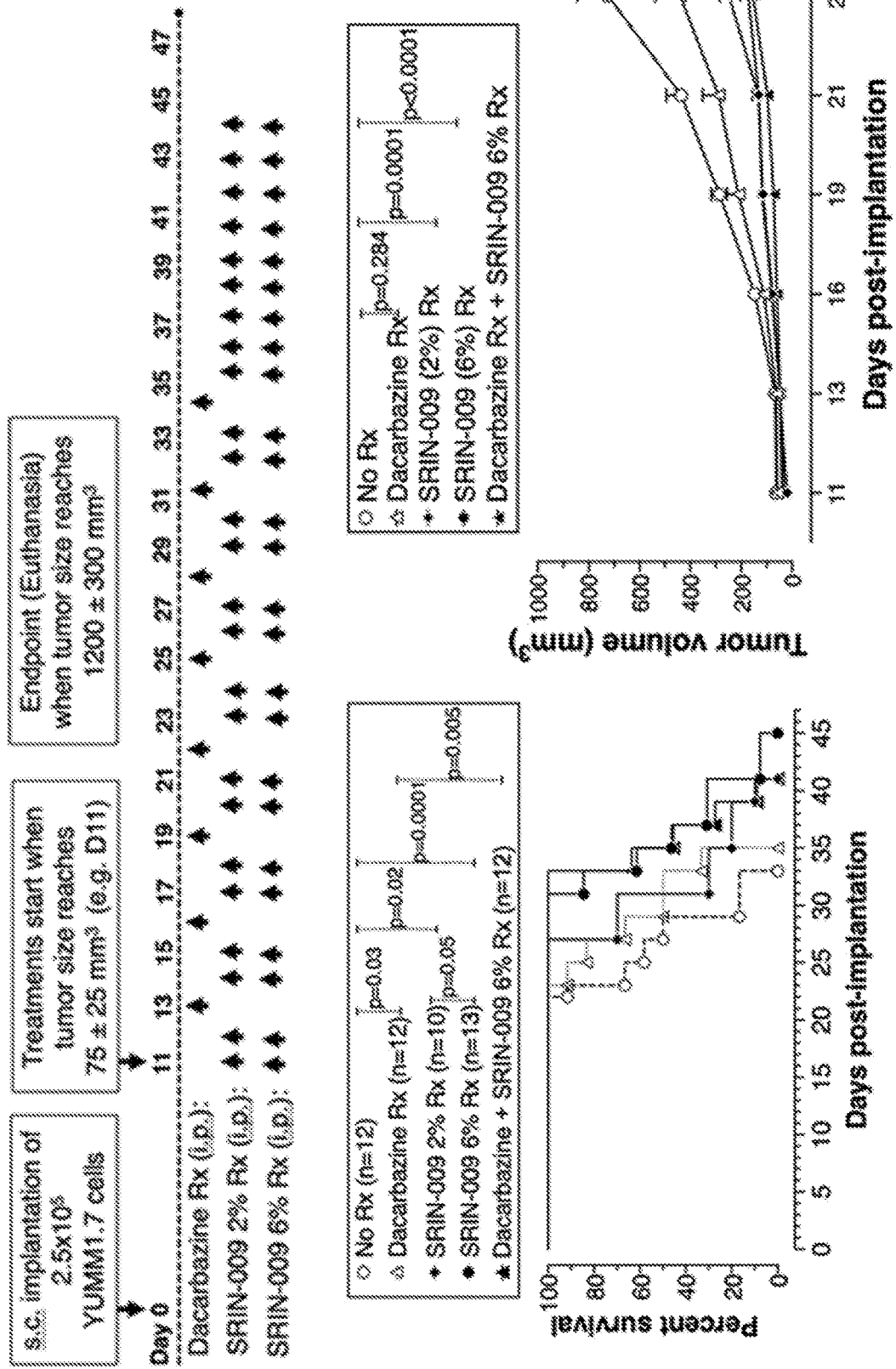

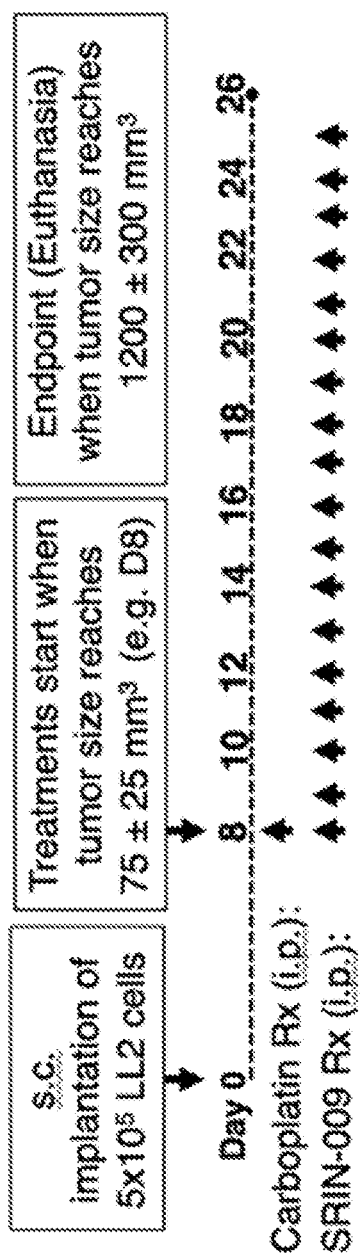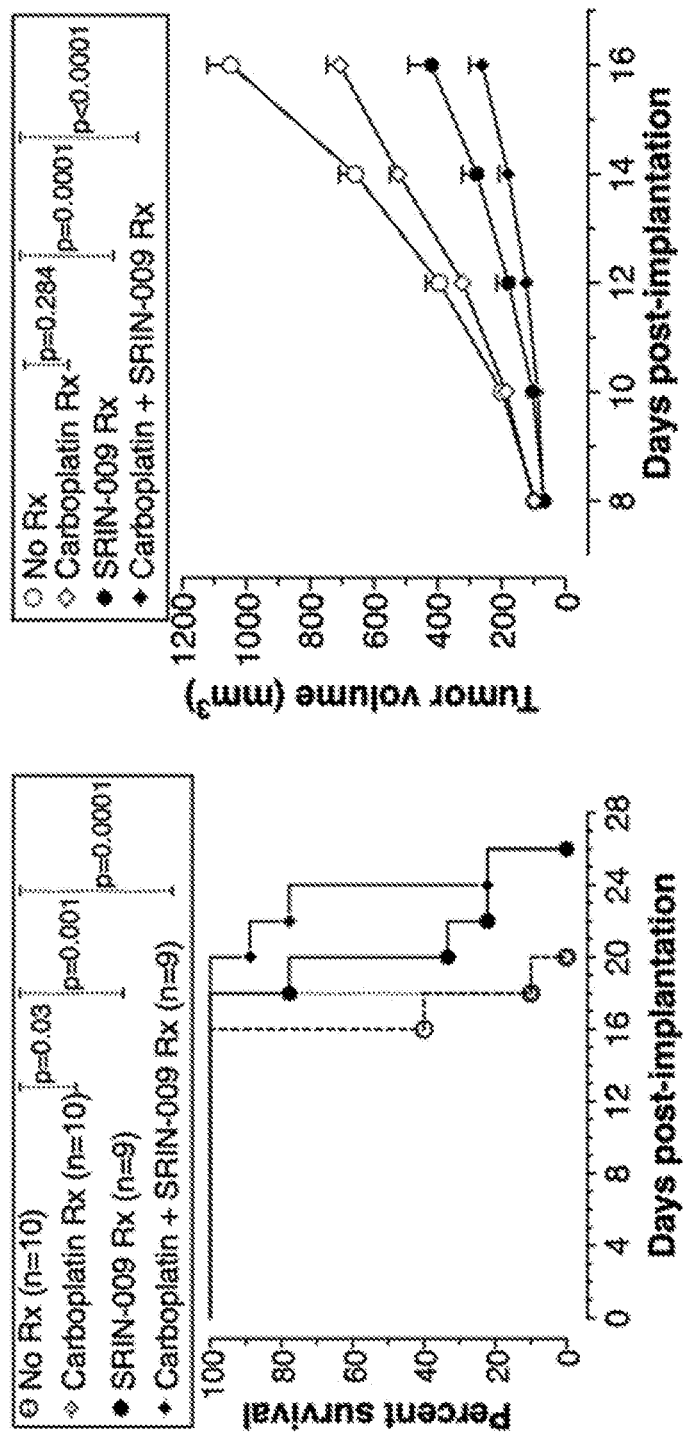
FIG. 6A
FIG. 6B
FIG. 6C

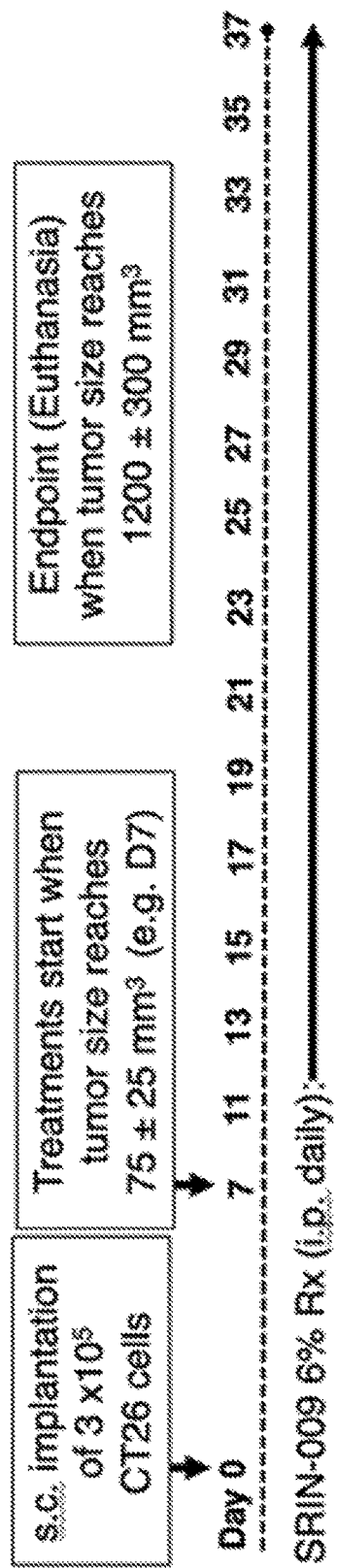
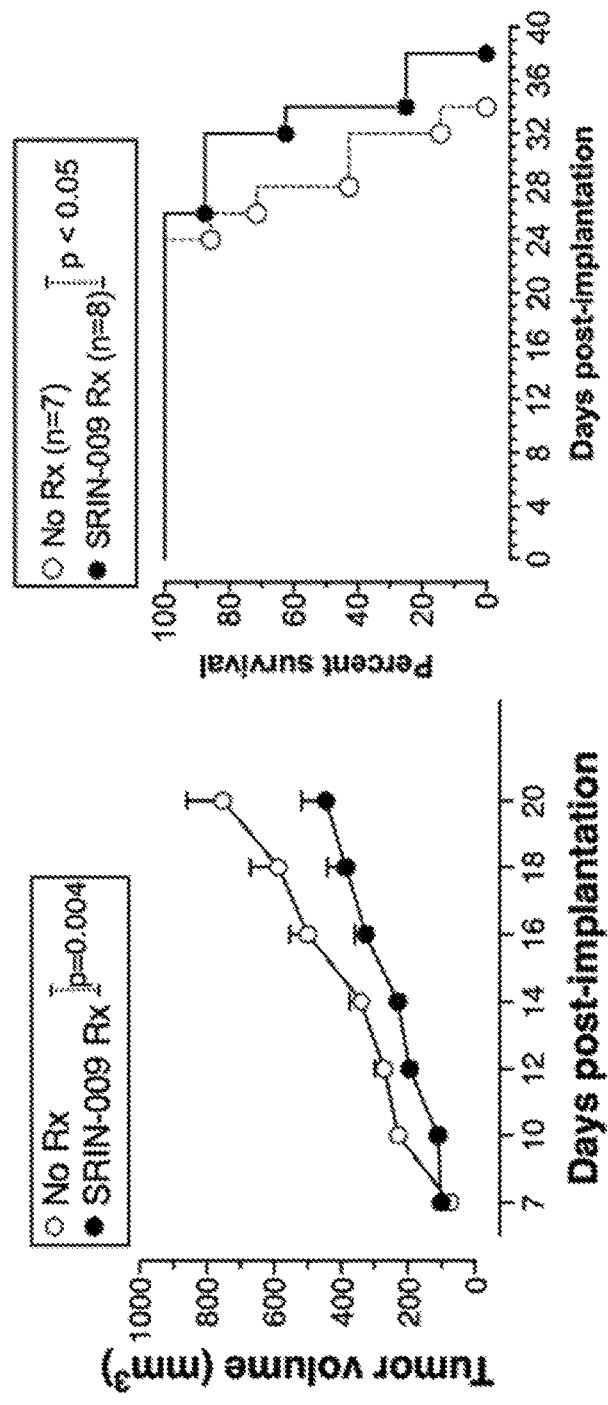
FIG. 7A
FIG. 7B
FIG. 7C

CANNABINOID COMPOSITIONS AND METHODS OF USE THEREOF FOR IMMUNE MODULATION

CROSS-REFERENCE TO RELATED APPLICATIONS

This application is a National Stage Entry under 35 U.S.C. 371 of International Patent Application No. PCT/US2020/017311, filed Feb. 7, 2020, which claims priority to U.S. Provisional Patent Application No. 62/802,754, filed Feb. 8, 2019, which is incorporated herein by reference.

BACKGROUND OF THE INVENTION

The human endocannabinoid system responds to endocannabinoids produced in the body as well as to phytocannabinoids, including cannabidiol [1]. CB1 and CB2 are the two major receptors for cannabinoids in both humans and mice [2-5]. Cannabidiol is a major non-psychoactive constituent of the cannabis plant. In June 2018, the FDA approved the first ever cannabis-derived medicine, Epidiolex, which contains cannabidiol as the active pharmaceutical ingredient (API), for treating childhood epilepsy syndromes, such as Dravet syndrome and Lennox-Gastaut syndrome, which typically do not respond to anti-seizure medications [6]. Cannabidiol is proposed to treat a variety of other diseases including cancer [5, 7-11]. Cannabidiol possesses a number of anti-neoplastic properties, such as inhibiting cancer cell invasion and inducing apoptosis and autophagy of cancer cells [12-25]. Cannabidiol also improves the overall health of cancer patients and reduces the side effects of chemotherapy such as nausea, vomiting, and anorexia [26]. Furthermore, cannabidiol inhibits chemotherapy-induced neuropathic pain, through serotonin 1A receptors, without diminishing nervous system function or chemotherapy efficacy [27]. CB2 is also highly expressed on most cells of hematopoietic lineage including lymphocytes and macrophages and is required for efficient immune responses and maintaining immune homeostasis [22, 28-33].

Chemotherapy results in impairment of various arms of the immune system [34]. Chemotherapy can dampen pre-existing immune memory generated by prior vaccination and, as a result, patients receiving chemotherapy are more readily susceptible to a variety of infections than normal individuals. It is also known that the tumor microenvironment itself is a highly immunosuppressive environment. Therefore, such tissue environment hinders the anti-tumor activity of the immune system. Some immunotherapy drugs, which are referred to as immune checkpoint inhibitors, have the capacity to augment anti-tumor activity of the immune system. However, the very nature of chemotherapy (that is involved in the treatment of cancer patients), is that it adversely affects the immune system.

Thus, there is presently a need for cannabinoid-based treatments for cancer and improving immune function in certain groups of individuals, such as chemotherapy patients.

SUMMARY OF THE INVENTION

The present disclosure relates to phytocannabinoid-containing compositions and methods of use thereof for improving aspects of the immune response.

In one aspect, a nanoemulsion comprising one or more phytocannabinoid isolates and at least four terpene isolates is provided. In a further aspect, the composition includes olive oil, a surfactant, and sterile water. Phytocannabinoid isolates can be selected from cannabidiol, cannabidiphorol, tetrahydrocannabiphorol, cannabidiolic acid, tetrahydrocannabinol, tetrahydrocannabinolic acid, cannabigerol, cannabinol, cannabichromene, tetrahydrocannabivarin, and cannabidivarin, and, in certain embodiments, are found at a concentration in the range of 0.5 to 2000 mg/ml and have a purity equal to or greater than 90%. In certain embodiments, the phytocannabinoid isolate is cannabidiol, and the hydro-lipid excipient complex includes olive oil, polysorbate 80, water, limonene, linalool, myrcene, and alpha-pinene. In certain embodiments the nanoemulsion is characterized by a mean particle diameter size up to 900 nm. In certain embodiments, the compositions provided herein are suitable for or formulated for topical, oral, or sublingual administration in a solution, spray, drop, strip, cream, or capsule.

In yet another embodiment, a method is provided for treating, inhibiting, and/or limiting the progression of a cancer in a subject that includes administering a nanoemulsion composition described herein. In certain embodiments, the subject has melanoma, lung cancer, or colorectal cancer. In certain embodiments, a nanoemulsion composition is administered in combination with another therapy, for example a chemotherapeutic agent, immunotherapy, or small molecule agent.

In certain embodiments, a method is provided for treating, inhibiting, and/or limiting the progression inflammatory disease in a subject that includes administering a nanoemulsion composition described herein.

In yet another embodiments, the method provided is intended to treat a subject that i) is being treated with chemotherapy or is recovering from chemotherapy; ii) received a bone marrow transplant or hematopoietic stem cell transplant; iii) received a blood cell transfusion; iv) has undergone the taking of a blood sample; v) has a low white blood cell count; vi) has a low red blood cell count; vii) has been administered a checkpoint-inhibitor based immunotherapy; viii) has undergone or is undergoing chemotherapy in conjunction with immunotherapy; ix) has undergone or is undergoing radiation therapy; x) has undergone or is undergoing radiation therapy in conjunction with either or both chemotherapy and immunotherapy; xi) has a compromised, deficient immune system; and/or autoimmunity; has been diagnosed with human immunodeficiency virus (HIV) and/or acquired immunodeficiency syndrome (AIDS); and/or xiii) has a low platelet count; and/or xiii) has undergone surgery, transplant and/or treatment for graft versus host disease (GVHD).

In yet another aspect, a method for enhancing an immune response to a vaccine in a subject is provide, wherein the vaccine is selected from the 23 valent pneumococcal polysaccharide vaccine, the pneumococcal polysaccharide conjugate vaccine, *Salmonella* Vi polysaccharide vaccine, meningococcal polysaccharide vaccine, and *Hemophilus influenzae* polysaccharide vaccine.

In yet another aspect, a method for the use of a composition as an injectable adjuvant admixed with a vaccine to increase an immune response is provided. Uses of cannabinoid-containing nanoemulsions for the treatment of cancer, immune-mediated disease, or immune modulation are also provided.

In certain embodiments, provided herein are methods of manufacturing a composition described herein, where the method includes the steps of: (a) heating one or more cannabinoid isolate(s) (e.g. cannabidiol) to a temperature of at least 80 degrees Celsius and admixing the heated cannabinoid isolate with olive oil NF-grade, (b) homogenizing the mixture of step (a) via a thermomixer at least 100 rpm at 80 degrees Celsius; (c) adding the homogenized product of step (b) to a solution containing at least one non-ionic surfactant (e.g. polysorbate 80), sterile water USP-grade, and four or more terpene isolates (e.g. limonene, linalool, myrcene, alpha-pinene),and mixing; and (d) emulsifying and/or micro-shearing the product of step (c) for at least twenty-five (25) cycles via an emulsion chamber to generate water-soluble nanoparticles up to 900 nm in diameter. In yet a further embodiment, provided herein is a composition produced by a process that includes steps (a) through (d).

In further embodiments, provided herein are methods of manufacturing a composition described herein, where the method includes the steps of: (a) heating one or more cannabinoid isolate(s) (e.g. cannabidiol) to a temperature of at least 80 degrees Celsius and admixing the heated cannabinoid isolate with olive oil NF-grade, (b) homogenizing the mixture of step (a) via a thermomixer at least 100 rpm at 80 degrees Celsius; (c) adding the homogenized product of step (b) to a solution containing at least one (1) non-ionic surfactant (e.g. polysorbate 80), sterile water USP-grade, and four (4) or more terpene isolates (e.g. limonene, linalool, myrcene, alpha-pinene); and mixing; and (d) performing repeat sonification of the product of step (c) for at least ten (10) cycles at at least twenty (20) microns per cycle to generate water-soluble nanoparticles up to 900 nm in diameter. In yet a further embodiment, provided herein is a composition produced by a process that includes steps (a) through (d).

Other aspects and advantages of these compositions and methods are described further in the following detailed description

BRIEF DESCRIPTION OF THE DRAWINGS

FIG. 5A-FIG. 5C shows SRIN-009 treatment reduces tumor burden and prolongs survival in a syngeneic transplantable YUMM1.7 melanoma model. (FIG. 5A) An outline depicting the murine tumor and treatment studies. Ten-week old C57BL6 male mice were inoculated s.c. with 2×10$^5$ YUMM1.7 cells, and when tumors reached a volume of 75+25 mm$^3$, mice with similarly sized tumors were randomized into five groups and each group was subjected to the indicated treatment regimens at indicated time points: Group 1—Untreated mice (No Rx); Group 2—Dacarbazine (2.5 mg in 200 mcl i.p); Group 3—SRIN-009 2% (containing 2 mg cannabidiol, the API of SRIN-009 in 100 mcl i.p.); Group 4—SRIN-009 6% (containing 6 mg cannabidiol, the API of SRIN-009 in 100 mcl i.p.); Group 5—SRIN-009 6% (containing 6 mg cannabidiol in 100 mcl i.p.) and dacarbazine (2.5 mg in 200 mcl i.p). (FIG. 5B) When the tumor volume reached 1200+300 mm$^3$, mice were euthanized, and the day of euthanasia was considered as the endpoint for survival shown as in a Kaplan-Meier curve. Survival statistics were performed using log-rank (Mantel-Cox) test. (FIG. 5C) Each curve represents mean±SEM of indicated treatment groups and differences were determined using two-way ANOVA with Bonferroni post-test.

FIG. 6A-FIG. 6C show SRIN-009 treatment reduces tumor burden and prolongs survival in a syngeneic transplantable Lewis lung carcinoma (LL/2) model. (FIG. 6A) An outline depicting the murine tumor and treatment studies. Ten-week old C57BL6 male mice were inoculated s.c. with 5×10$^5$ LL/2 cells, and when tumors reached a volume of 75+25 mm$^3$, mice with similarly sized tumors were randomized into four groups and each group was subjected to the indicated treatment regimens at the indicated time points: Group 1—Untreated mice (No Rx); Group 2—Carboplatin (2.5 mg in 200 mcl i.p); Group 3—SRIN-009 6% (containing 6 mg cannabidiol, the API of SRIN-009 in 100 mcl i.p.); Group 4—SRIN-009 6% (containing 6 mg cannabidiol in 100 mcl and and carboplatin (2.5 mg in 200 mcl i.p). (FIG. 6B) When the tumor volume reached 1200±300 mm$^3$, mice were euthanized, and the day of euthanasia was considered as the endpoint for survival shown in a Kaplan-Meier curve. Survival statistics were performed using log-rank (Mantel-Cox) test. (FIG. 6C) Each curve represents mean±SEM of indicated treatment groups and represents mean±SEM and differences were determined using two-way ANOVA with Bonferroni post-test.

FIG. 7A-FIG. 7C show SRIN-009 treatment reduces tumor burden and prolongs survival in a syngeneic transplantable colon carcinoma (CT26) model. (FIG. 7A) An outline depicting the murine tumor and treatment studies. Ten-week old BALB/c female mice were inoculated s.c. with 3×10$^5$ CT.26 cells, and when tumors reached a volume of 75±25 mm³, mice, with similarly sized tumors were randomized into two groups and each group was subjected to indicated treatment regimens at indicated time points: Group 1—Untreated mice (No Rx) and Group 2—SRIN-009 6% (containing 6 mg cannabidiol, the API of SRIN-009 in 100 mcl i.p.); (FIG. 7B) Each curve represents kinetics of tumor growth mean±SEM and differences were determined using two-way ANOVA with Bonferroni post-test. (FIG. 7C) When the tumor volume reached 1200×300 mm³, mice were euthanized, and the day of euthanasia was considered as the endpoint for survival shown as in a Kaplan-Meier curve. Survival statistics were performed using log-rank (Mantel-Cox) test.

DETAILED DESCRIPTION OF THE INVENTION

Provided herein are compositions that are useful in the treatment of various cancers and other conditions. These compositions include phytocannabinoids, such as cannabidiol. While the usefulness of cannabinoids in many therapeutic areas remains unclear, it is known that there are limitations on the administration of cannabinoids. For example, due to the effect of first pass hepatic metabolism, the bioavailable dose of an orally administered cannabinoid that reaches systemic circulation is typically less than 10% [2, 3, 35]. Cannabinoids by nature are also highly lipophilic, essentially water insoluble molecules and are thus difficult to formulate in high concentrations without increasing the oil component of the formula. Further, certain administration routes such as intravenous, oral, and topical are limited in the total amount of API that can be in a single dose. While there have been multiple cannabinoid-based drugs approved by the FDA, all of these cannabinoid products are orally administered and there presently are no injectable cannabinoid-based drugs approved by the FDA.

Figure 2:
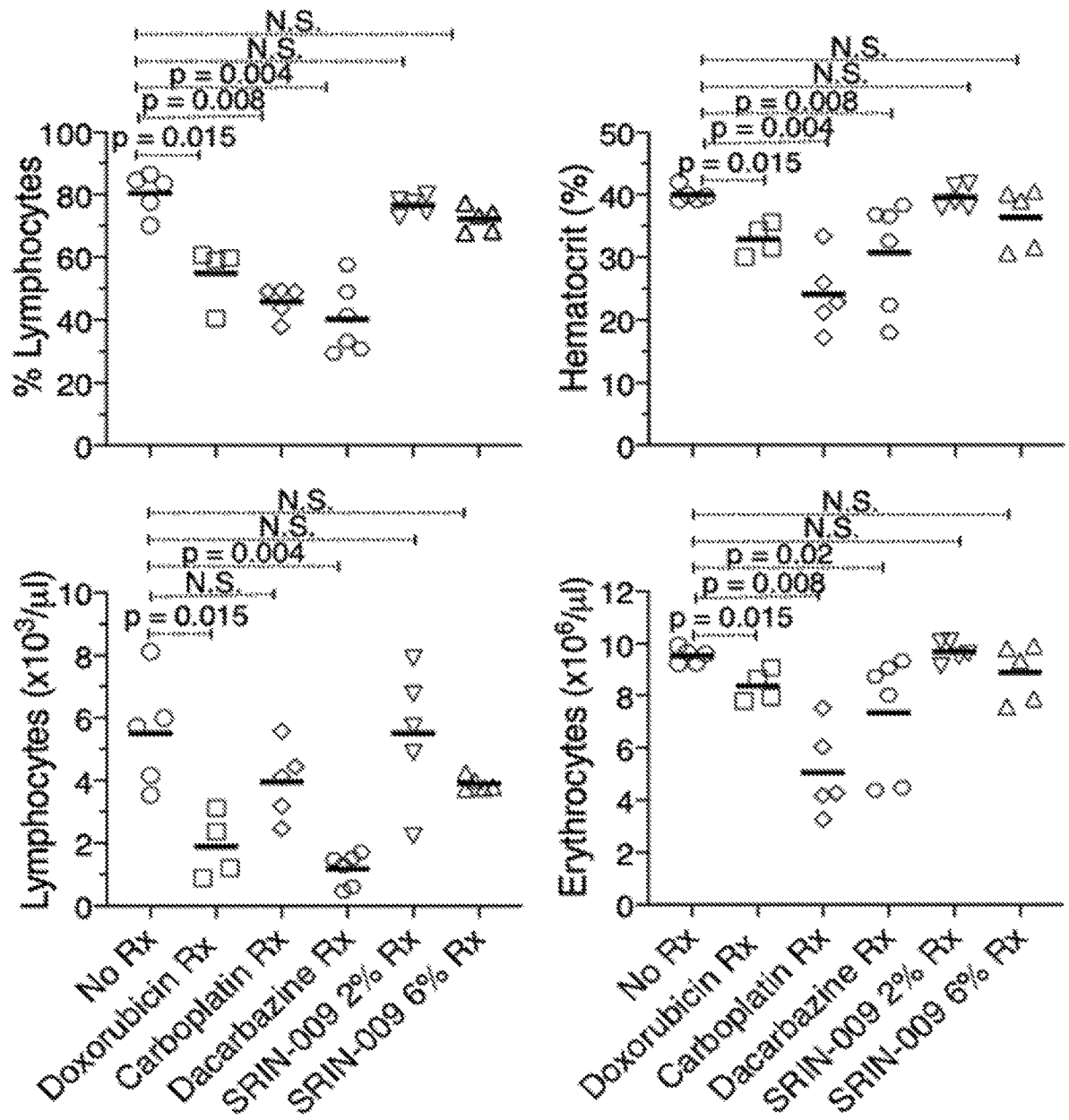
FIG. 2 shows SRIN-009 treatment does not adversely affect blood cell composition. Mice were treated with either dacarbazine, SRIN-009 2% or SRIN-009 6% (as shown in FIG. 5A), doxorubicin (250 mcg in 200 mcl PBS, i.p., once a week for 3 weeks) or carboplatin (1.25 mg in 200 mcl of PBS i.p. once). The % of lymphocyte or their numbers in the peripheral blood are shown along with red blood cell counts. Statistical differences were determined using Mann-Whitney, p value above 0.05 was considered not significant (N.S.)

Further, immune cells are adversely affected in cancer patients undergoing chemotherapy. We have identified that administration of exogenous cannabinoids, such as those naturally derived from plants have the capability to stabilize the immune system of chemotherapy patients (FIG. 2). The stability of the absolute cell numbers as well as the functions of various immune cell populations, such as granulocytes, dendritic cells, B cells, T cells and natural killer cells, are central for protection against infections as well as tumor surveillance. The proper function of the immune system is of paramount importance in cancer patients undergoing chemotherapy and immunotherapy. The compositions and methods provided herein can modulate and protect immune function in patients including those receiving chemotherapy. Restoration of the immune system in these individuals not only improves the ability to combat infections but also to eliminate chemotherapy-resistant cancer cells by the immune system. The compositions provided act synergistically with other drugs including immune checkpoint inhibitors (immunotherapy) to efficiently reduce tumor burden and prolong the survival of cancer patients.

Unless defined otherwise in this specification, technical and scientific terms used herein have the same meaning as commonly understood by one of ordinary skill in the fields of biology, biotechnology and molecular biology and by reference to published texts, which provide one skilled in the art with a general guide to many of the terms used in the present application. The definitions herein are provided for clarity only and are not intended to limit the claimed invention.

As used herein, the term "subject" means a mammalian animal, including a human, a veterinary or farm animal, a domestic animal or pet, and animals normally used for clinical research. In one embodiment, the subject of these methods and compositions is a human. Still other suitable subjects include, without limitation, murine, rat, canine, feline, porcine, bovine, ovine, non-human primate and others. As used herein, the term "subject" is used interchangeably with "patient".

The term "*Cannabis*" refers to plants of the genus *Cannabis*, including *Cannabis sativa, Cannabis indica*, and *Cannabis ruderalis*.

The term "cannabinoid" refers to a chemical compound that shows direct or indirect activity on cannabinoid and related receptors. There are two main cannabinoid receptors, CNR1 (also known as CB1) and CNR2 (also known as CB2) [1]. Other receptors that research indicates have cannabinoid activity include the GPR55, GPR18, and TRPV1 receptors [36-39]. The term "phytocannabinoid" refers to cannabinoids that occur in a plant species or that are derived from cannabinoids occurring in a plant species. Phytocannabinoids can be isolated cannabinoids or present as a botanical drug substance [40]. Examples of cannabinoids include, but are not limited to, tetrahydrocannabinol (THC), cannabidiol (CBD), cannabinol (CBN), cannabigerol (CBG), cannabichromene (CBC), cannabicyclol (CBL), cannabivarin (CBV), tetrahydrocannabivarin (THCV), cannabidivarin (CBDV), cannabichromevarin (CBCV), cannabigerovarin (CBGV), and cannabigerol monomethyl ether (CBGM).

The term "strain" refers to different varieties of a particular plant genus. For example, the term strain can refer to different varieties of cannabis plants. Different cannabis strains often exhibit distinct chemical compositions with characteristic levels of cannabinoids and terpenes, as well as other components. Differing cannabinoid and terpene profiles associated with different cannabis strains can be useful for the treatment of different diseases, or for treating different subjects with the same disease.

The term "cannabis oil" refers to a mixture of compounds obtained from the extraction of cannabis plants. Such compounds include, but are not limited to, cannabinoids, terpenes, terpenoids, and other compounds found in the cannabis plant. The exact composition of cannabis oil will depend on the strain of cannabis that is used for extraction, the efficiency and process of the extraction itself, and any additives that might be incorporated to alter the palatability or improve administration of the cannabis oil.

The term "derived from" is used to identify the original source of a molecule is not meant to limit the method by which the molecule is made which can be, for example, by chemical synthesis or recombinant means.

The term "cancer" or "proliferative disease" as used herein means any disease, condition, trait, genotype or phenotype characterized by unregulated cell growth or replication as is known in the art. A "cancer cell" is cell that divides and reproduces abnormally with uncontrolled growth. This cell can break away from the site of its origin (e.g., a tumor) and travel to other parts of the body and set up another site (e.g., another tumor), in a process referred to as metastasis. A "tumor" is an abnormal mass of tissue that results from excessive cell division that is uncontrolled and progressive and is also referred to as a neoplasm. Tumors can be either benign (not cancerous) or malignant. The methods described herein are useful for the treatment of cancer and tumor cells, i.e., both malignant and benign tumors. In various embodiments of the methods and compositions described herein, the cancer can include, without limitation, breast cancer, lung cancer, prostate cancer, colorectal cancer, brain cancer, esophageal cancer, stomach cancer, bladder cancer, pancreatic cancer, cervical cancer, head and neck cancer, ovarian cancer, melanoma, acute and chronic lymphocytic and myelocytic leukemia, myeloma, Hodgkin's and non-Hodgkin's lymphoma, and multi-drug resistant cancers.

Compositions

The compositions provided herein include one or more of: a phytocannabinoid isolate, and one or more of: a surfactant agent, a terpene, an oil-based solvent and/or water. In some embodiments, the compositions include more than one phytocannabinoid, terpene, surfactant and/or oil-based solvent. In a certain embodiment, the composition includes a phytocannabinoid, a terpene, a surfactant, a flavoring agent, D-mannose, xylitol, and an oil-based solvent.

In certain embodiments, the composition is a nanoemulsion with one or more phytocannabinoid isolates and at least four terpene isolates selected from limonene, myrcene, linalool, alpha-pinene, humulene, caryophyllene, β-caryophyllene, beta-pinene, α-phellandrene, Δ3-carene, α-terpinene, β-phellandrene, cis-ocimene, terpinolene, α-guaiene, δ-guaiene, elemene, guaiol, γ-eudsmol, β-eudesmol, agarospirol, bulnesol, and α-bisabolol. In yet further embodiments, the composition includes olive oil, and surfactant, and optionally water. In certain embodiments, the composition is formulated for intravenous administrations. In certain embodiments, the composition includes a combination of limonene, linalool, myrcene, and alpha-pinene. The terpene isolates may be botanically-derived or synthetic.

In certain embodiments, the composition includes cannabidiol (CBD). In another embodiment, the composition includes delta-9-tetrahydocannabinol (THC). In yet another embodiment, the composition includes a combination of CBD and THC.

In certain embodiments, provided herein is an injectable cannabinoid API formulation that can be administered safely to a subject with minimal adverse effects, while delivering an efficient API dose and improving one or more of bioavailability, bioactivity and efficacy. In certain embodiments, the injection composition contains a hydro-lipid emulsion excipient complex that enhances the anti-cancer efficacy as well as the solubility profile of the cannabinoid, such as cannabidiol. In yet further embodiments, an injectable formulation is provided having an API-grade isolated phytocannabinoid and a hydro-lipid excipient complex including olive oil NF-grade, a surfactant, water-USP, and at least four generally recognized as safe (GRAS) terpene isolates.

A phytocannabinoid or combination of phytocannabinoids may be present in a pharmaceutical composition in an amount suitable for its intended use. In aspects of this embodiment, a composition includes a phytocannabinoid or a combination of phytocannabinoids in an amount of, e.g., about 0.5 mg/ml, about 1 mg/ml, about 2 mg/ml, about 5 mg/ml, about 10 mg/ml, about 20 mg/ml, about 25 mg/ml, about 40 mg/ml, about 50 mg/ml, about 75 mg/ml, about 100 mg/ml, about 150 mg/ml, about 200 mg/ml, about 250 mg/ml, 300 mg/ml, about 350 mg/ml, about 400 mg/ml, about 450 mg/ml, about 500 mg/ml, about 550 mg/ml, about 600 mg/ml, about 650 mg/ml, about 700 mg/ml, about 750 mg/ml, about 800 mg/ml, about 850 mg/ml, about 900 mg/ml, about 950 mg/ml, about 1000 mg/ml, about 1050 mg/ml, about 1100 mg/ml, about 1150 mg/ml, about 1200 mg/ml, about 1250 mg/ml, about 1300 mg/ml, about 1350 mg/ml, about 1400 mg/ml, about 1450 mg/ml, about 1500 mg/ml, about 1550 mg/ml, about 1600 mg/ml, about 1650 mg/ml, about 1700 mg/ml, about 1750 mg/ml, about 1800 mg/ml, about 1850 mg/ml, about 1900 mg/ml, about 1950 mg/ml, or about 2000 mg/ml. In other aspects, a pharmaceutical composition is provided having a phytocannabinoid or a combination of phytocannabinoids in an amount of, e.g., at least 0.5 mg/ml, at least 1 mg/ml, at least 2 mg/ml, at least 5 mg/ml, at least 10 mg/ml, at least 20 mg/ml, at least 25 mg/ml, at least 40 mg/ml, at least 50 mg/ml, at least 100 mg/ml, at least 150 mg/ml, at least 200 mg/ml, at least 250 mg/ml, at least 300 mg/ml, at least 350 mg/ml, at least 400 mg/ml, at least 450 mg/ml, at least 500 mg/ml, at least 550 mg/ml, at least 600 mg/ml, at least 650 mg/ml, at least 700 mg/ml, at least 750 mg/ml, at least 800 mg/ml, at least 850 mg/ml, at least 900 mg/ml, at least 950 mg/ml, at least 1000 mg/ml, at least 1050 mg/ml, at least 1100 mg/ml, at least 1150 mg/ml, at least 1200 mg/ml, at least 1250 mg/ml, at least 1300 mg/ml, at least 1350 mg/ml, at least 1400 mg/ml, at least 1450 mg/ml, at least 1500 mg/ml, at least 1550 mg/ml, at least 1600 mg/ml, at least 1650 mg/ml, at least 1700 mg/ml, at least 1750 mg/ml, at least 1800 mg/ml, at least 1850 mg/ml, at least 1900 mg/ml, or at least 1950 mg/ml. In yet other embodiments, a pharmaceutical composition includes a phytocannabinoid or a combination of phytocannabinoids in an amount of, e.g., at most 0.5 mg/ml, at most 1 mg/ml, at most 2 mg/ml, at most 5 mg/ml, at most 10 mg/ml, at most 20 mg/ml, at most 25 mg/ml, at most 40 mg/ml, at most 50 mg/ml, at most 75 mg/ml, at most 100 mg/ml, at most 150 mg/ml, at most 200 mg/ml, 250 mg/ml, at most 250 mg/ml, at most 300 mg/ml, at most 350 mg/ml, at most 400 mg/ml, at most 450 mg/ml, at most 500 mg/ml, 550 mg/ml, at most 600 mg/ml, at most 650 mg/ml, at most 700 mg/ml, at most 750 mg/ml, at most 800 mg/ml, at most 850 mg/ml, at most 900 mg/ml, at most 950 mg/ml, or at most 1000 mg/ml, at most 1100 mg/ml, at most 1150 mg/ml, at most 1200 mg/ml, at most 1250 mg/ml, at most 1300 mg/ml, at most 1350 mg/ml, 1400 mg/ml, at most 1450 mg/ml, at most 1500 mg/ml, at most 1550 mg/ml, at most 1600 mg/ml, at most 1650 mg/ml, at most 1700 mg/ml, at most 1750 mg/ml, at most 1800 mg/ml, at most 1850 mg/ml, at most 1900 mg/ml, at most 1950 mg/ml, or at most 2000 mg/ml.

In certain embodiments, the phytocannabinoid or the combination of phytocannabinoids is present in the composition at a concentration of 0.5 to 2000 mg/ml. In certain embodiments, a CBD isolate is present in the composition at 0.5 to 2000 mg/ml and has purity equal to or greater than 90% or equal to or greater than 95%.

In yet other embodiments, a composition is provided having a phytocannabinoid or a combination of phytocannabinoids in an amount ranging from 1% to 50% w/v. In certain embodiments, a composition includes a phytocannabinoid or a combination of phytocannabinoids in an amount of about 0.5% w/v, about 0.75% w/v, about 1% w/v, about 2% w/v, about 3% w/v, about 4% w/v, about 5% w/v, about 6% w/v, about 7% w/v, about 8% w/v, about 9% w/v, about 10% w/v, about 11% w/v, about 12% w/v, about 13% w/v, about 14% w/v, about 15% w/v, about 16% w/v, about 17% w/v, about 18% w/v, about 19% w/v, about 20% w/v, about 21% w/v, about 22% w/v, about 23% w/v, about 24% w/v, or about 25% w/v, or about 50% w/v. In certain embodiments, a composition includes a phytocannabinoid or a combination of phytocannabinoids in an amount of at least 0.5% w/v, at least 0.75% w/v, at least 1% w/v, at least 2% w/v, at least 3% w/v, at least 4% w/v, at least 5% w/v, at least 6% w/v, at least 7% w/v, at least 8% w/v, at least 9% w/v, at least 10% w/v, at least 11% w/v, at least 12% w/v, at least 13% w/v, at least 14% w/v, at least 15% w/v, at least 16% w/v, at least 17% w/v, at least 18% w/v, at least 19% w/v, at least 20% w/v, at least 21% w/v, at least 22% w/v, at least 23% w/v, at least 24% w/v, or at least 25% w/v.

The term "purity" refers to the isolation of a material such that it is substantially or essentially free from components which normally accompany it as found in its native state. Purity and can be determined using analytical chemistry techniques known in the art including e.g. polyacrylamide gel electrophoresis or high-performance liquid chromatography.

The term "nanoemulsion" as used herein means a homogenized oil and water solution, and optionally other excipients or terpenes. A nanoemulsion contains nanoparticles, nanosomes or nanoliposomes that have, for example, particle diameter sizes ranging up to 900 nm.

The term "cannabinoid hydro-lipid excipient complex" as used in this disclosure refers to a complex of active and inactive ingredients in a type of nanoemulsion composition that includes cannabinoids, such as CBD, in a formulation which is made up of, for example, an oil, water, a surfactant, and other excipients. SRIN-009 refers to a cannabinoid hydro-lipid excipient complex (CHLEC) nanoemulsion composition that is suitable for injectable use as well as delivery via other routes of administration. SRIN-009 can be delivered as a single agent or adjunct therapy, i.e. in combination or sequentially with a therapeutically effective drug regimen to treat cancer and other diseases.

In certain embodiments, the composition includes a phytocannabinoid isolate that is cannabidiol, cannabidiphorol, tetrahydrocannabiphorol, cannabidiolic acid, tetrahydrocannabinol, tetrahydrocannabinolic acid, cannabigerol, cannabinol, cannabichromene, tetrahydrocannabivarin, and cannabidivarin, isolate having a purity equal to or greater than 90% or equal to or greater than 95%. In certain embodiments the CBD isolate is present at a concentration from 1 to 1000 mg/ml and has a purity equal to or greater than 95%.

Flavoring agents useful herein include any material or mixture of materials operable to enhance the taste of a composition. Any orally acceptable natural or synthetic flavoring agents can be used, such as essential oils, various flavoring aldehydes, flavoring oils, esters, alcohols, similar materials, as well as sweeteners such as sodium saccharin, xylitol, D-mannose, and combinations thereof. Essential oils can include, but are not limited to: Ylang Ylang (*Cananga odorata*); Yarrow (*Achillea millefolium*); Violet (*Viola odorata*); Vetiver (*Vetiveria zizanoides*); Vanilla (*Vanilla plantifolia*); Tuberose (*Polianthes tuberosa*); Thyme (*Thymus vulgaris L.*); Tea Tree (*Melaleuca alternifolia*); Tangerine (*Citrus reticulata*); Spruce, Black (*Picea mariana*); Spruce (*Tsuga Canadensis*); Spikenard (*Nardostachys jatamansi*); Spearmint (*Mentha spicata*); Sandalwood (*Santalum spicatum*); Rosewood (*Aniba rosaeodora*); Rosemary Verbenone (*Rosmarinus officinalis*); Rosemary (*Rosmarinus officinalis*); Rose (*Rosa damascena*); Rose Geranium (*Pelargonium roseum*); Ravensara (*Ravensara aromatica*); Plai (*Zingiber cassumunar*) Pine Needle (*Pinus sylvestris L.*); Petitgrain (*Citrus aurantium*); Peppermint (*Mentha piperita*); Pepper, Black (*Piper nigrum L.*); Patchouli (*Pogostemon cablin*); Palo Santo (*Bursera graveolens*); Palmarosa (*Cymbopogon martini*); Osmanthus (*Osmanthus fragrans*); Oregano (*Origanum vulgare*); Orange, Sweet (*Citrus sinensis*); Oak Moss (*Evemia prunastri*); Nutmeg (*Myristica fragrans*) Niaouli (*Melaleuca viridifloria*); Neroli (aka Orange Blossom) (*Citrus aurantium*); Myrtle (*Myrtus communis*); Myrrh (*Commiphora myrrha*); Mimosa (*Acacia decurrens*); Melissa (*Melissa officinalis L.*); Marjoram, Sweet (*Origanum majorana*); Manuka (*Leptospermum scoparium*); Mandarin, Red (*Citrus deliciosa*); Mandarin (*Citrus deliciosa*); Lotus, White (*Nelumbo nucifera*); Lotus, Pink (*Nelumbo nucifera*); Lotus, Blue (*Nelumbo nucifera*); Lime (*Citrus aurantifolia*); Lily (*Lilum aurantum*); Lemongrass (*Cymbopogon citratus*); Lemon (*Citrus limonum*); Lavender (*Lavandula angustifolium*); Lavandin (*Lavandula hybrida grosso*); Kanuka (*Kunzea ericoides*); Juniper Berry (*Juniperus cummunis*); Jasmine (*Jasminum officinale*); Jasmine Abs (*Jasminum sambac*); Helichrysum (*Helichrysum italicum*); Grapefruit, White (*Citrusxparadisi*); Grapefruit, Pink (*Citrus paradisi*); Ginger (*Zingiber officinalis*); Geranium (*Pelargonium graveolens*); Geranium, Bourbon (*Pelargonium graveolens, Herit*); Gardenia (*Gardenia jasminoides*); Galbanum (*Ferula galbaniflua*); Frankincense (*Boswellia carterii*); Frangipani (*Plumeria alba*); Fir Needle White (*Abies alba*); Fir Needle Siberia (*Abies siberica*); Fir Needle Canada (*Abies balsamea*); Fennel, Sweet (*Foeniculum vulgare*); Eucalyptus Smithii. Eucalyptus Radiata, Eucalyptus Globulus, Eucalyptus Citriodora, Eucalyptus Blue Mallee (*Eucalyptus polybractea*); Elemi (*Canarium luzonicum*); Dill (*Anethum graveolens*); Cypress (*Cupressus sempervirens*); Cumin (*Cuminum cyminum*); Coriander (*Coriandum sativum*); Cocoa (*Theobroma cacao*); Clove (*Eugenia caryophylatta*); Clary Sage (*Salvia sclarea*); Cistus (aka Labdanum) (*Cistus ladaniferus L.*); Cinnamon (*Cinnamomum zeylanicum*); Chamomile, Roman (*Anthemis nobilis*); Chamomile, Blue (*Matricaria chamomilla*); Celery Seed (*Apium graveolins*); Cedarwood, Western Red (*Thuja plicata*); Cedarwood, Blood (*Juniperus virginiana*); Cedarwood Atlas (*Cedrus atlantica*); Carrot Seed (*Daucus carota*); Cardamon (*Elettaria cardamomum*); Caraway Seed (*Carum carvi*); Cajeput (*Melaleuca cajuputi*); Cade (*Juniperus oxycedrus*); Birch, White (*Betula alba*); Birch, Sweet (*Betula lenta*); Bergamot (*Citrus bergamia*); Bay Laurel (*Laurus nobilis*); Basil (*Ocimum basilicum*); Basil, Holy (*Ocimum sanctum*); Basil (*Ocimum basilicum*); Balsam Poplar (*Populus balsamifera*); Balsam Peru (*Myroxylon balsamum*); Angelica (*Angelica archangelica L.*); and combinations thereof. Flavoring agents include, for example, vanillin, sage, marjoram, parsley oil, spearmint oil, cinnamon oil, oil of wintergreen (methylsalicylate), peppermint oil, clove oil, bay oil, anise oil, eucalyptus oil, citrus oils, fruit oils, and essences including those derived from lemon, orange, lime, grapefruit, apricot, banana, grape, apple, strawberry, cherry, pineapple, etc., bean- and nut-derived flavors such as coffee, cocoa, cola, peanut, almond, etc., adsorbed and encapsulated flavoring agents, and mixtures thereof. Flavoring agents also include ingredients that provide fragrance and/or other sensory effect in the mouth, including cooling or warming effects. Such ingredients include menthol, menthyl acetate, menthyl lactate, camphor, eucalyptus oil, eucalyptol, anethole, eugenol, cassia, oxanone, [alpha]-irisone, propenyl guaiethol, thymol, linalool, benzaldehyde, cinnamaldehyde, N-ethyl-p-menthan-3-carboxamine, N,2,3-trimethyl-2-isopropylbutanamide, 3-1-menthoxypropane-1,2-diol, cinnamaldehyde glycerol acetal (CGA), methane glycerol acetal (MGA) and mixtures thereof. As described herein, where the composition includes an oil-based solvent, the composition preferably includes a lipophilic flavoring agent, preferably menthol, vanillin or an essential oil (preferably orange oil, lemon oil, clove oil, peppermint oil, spearmint oil or aniseed oil).

For compositions that are administered orally/sublingually, sweetness of the composition improves patient compliance and acceptance (i.e. due to improved taste). Thus, compositions provided herein include xylitol, a sugar alcohol, which improves taste, has negligible effects on blood sugar because it is metabolized independently off insulin, is not carcinogenic and does not cause tooth discoloration (as with glucose or sucrose).

One or more flavoring agents are present in the composition provided herein in individual or total amounts of 1 to 10 mg/ml, 10 to 50 mg/ml, 50 to 100 mg/ml, 100 to 250 mg/ml, 250 to 500 mg/ml, 500 to 750 mg/ml, or 750 to 1000 mg/ml.

Further, in certain embodiments, the composition provided herein includes one or more sugars for a purpose other than as a flavoring agent. In particular, the provided composition may include one or more of D-mannose, xylitol, and sorbitol which synergistically improve the immune enhancing properties of a composition as described herein. Thus, in a certain embodiment, the composition provided includes both D-mannose and xylitol which are each present at concentrations ranging from about 10 mg/ml to about 1000 mg/ml. In further embodiments, the composition includes D-mannose and xylitol where each are present at 1 to 10 mg/ml, 10 to 50 mg/ml, 50 to 100 mg/ml, 100 to 250 mg/ml, 250 to 500 mg/ml, 500 to 750 mg/ml, or 750 to 1000 mg/ml. Sugars may be included in compositions formulated for intravenous or other routes of administration.

As used herein, "terpene" refers to a hydrocarbon or derivative thereof, found as a natural product and biosynthesized by oligomerization of isoprene units. A terpene can be acyclic, monocyclic, bicyclic, or multicyclic. Examples include limonene, pulegone, caryophyllene epoxide, and the like. As used herein, the term "terpene" includes corresponding terpenoid or sesquiterpenoid compounds. Over 100 different terpenes have been identified in the cannabis plant, and every strain tends toward a unique terpene type and composition. Examples of terpenes include, but are not limited to: beta-caryophyllene [(1R,4E,9S)-4,11,11-trimethyl-8-methylene-bicyclo(7.2.0)undec-4-ene]; beta-caryophyllene oxide; citronellol [3,7-dimethyl-.delta.-octen-1-ol]; alpha.-eudesmol [2-[(2R,4aR)-4a,8-dimethyl-2,3,4,5,6,8a-hexahydro-1H-naphthalen-2-yl]prop-an-2-ol]; beta-eudesmol [2-[(2R,4aR,8aS)-4a-methyl-8-methylene-1,2,3,4,5,6,7,8a-octahydronaphth-alen-2-yl]propan-2-ol]; gamma-eudesmol [2-[(2R,4aR)-4a, 8-dimethyl-2,3,4,5,6,7-hexahydro-1H-naphthalen-2-yl]propan-2-ol]; geraniol [(2E)-3,7-dimethylocta-2,6-dien-1-ol]; guaiol [2-[(3S,5R, 8S)-3,8-dimethyl-1,2,3,4,5,6,7,8-octahydroazulen-5-yl]propan-2-oil; alpha-humulene [(1E,4E,8E)-2,6,6,9-tetramethylcycloundeca-1,4,8-triene]; beta-humulene [(1E,5E)-1,4,4-trimethyl-8-methylidenecycloundeca-1,5-diene]; gamma-humulene [(1Z,6E)-1,8,8-trimethyl-5-methydenecycloundeca-1,6-diene]; D-limonene [(4R)-1-methyl-4-prop-1-en-2-ylcyclohexene]; L-limonene [(4S)-1-methyl-4-prop-1-en-2-ylcyclohexene]; (−)-linalool [(3R)-3,7-dimethylocta-1,6-dien-3-ol]; (+)-linalool [(3S)-3,7-dimethylocta-1,6-dien-3-ol]; alpha-myrcene [2-methyl-.delta.-methylideneocta-1,7-diene]; beta-myrcene [7-methyl-3-methylideneocta-1,6-diene]; nerol [(2Z)-3,7-dimethylocta-2,6-dien-1-ol]; cis-nerolidol [(6Z)-3,7,11-trimethyldodeca-1,6,10-trien-3-ol]; trans-nerolidol [(6E)-3,7,11-trimethyldodeca-1,6,10-trien-3-ol]; alpha-ocimene [(3E)-3, 7-dimethylocta-1,3,7-triene]; beta-ocimene [(3E)-3,7-dimethylocta-1,3,6-triene]; p-cymene [1-methyl-4-(1-methylethyl)benzene]; alpha-phellandrene [2-methyl-5-propan-2-ylcyclohexa-1,3-diene]; beta-phellandrene [3-methylidene-delta-propan-2-ylcyclohexene]; cis-phytol [(Z,7R,11R)-3,7,11,15-tetramethylhexadec-2-en-1-ol]; trans-phytol [(E,7R,11R)-3,7,11,15-tetramethylhexadec-2-en-1-ol]; (−)-alpha-pinene R1S,5S)-4,6,6-trimethylbicyclo [3.1.1]hept-3-ene]; (−)-.alpha.-pinene [(1S,5S)-6,6-dimethyl-4-methylidenebicyclo[3.1.1]heptane]; (+)-.alpha.-pinene [(1R,5R)-4,6,6-trimethylbicyclo[3.1.1]hept-3-ene]; (+)-beta-pinene [(1R,5R)-6,6-dimethyl-4-methylidenebicyclo[3.1.1]heptane]; (−)-pulegone [(5S)-5-methyl-2-propan-2-yldenecyclohexan-1-one]; (+)-pulegone [(5R)-5-methyl-2-propan-2-ylidenecyclohexan-1-one]; .alpha.-terpinene [1-methy-1-4-propan-2-ylcyclohexa-1,3-diene]; delta-terpinene [5-methyl-2-propan-2-ylcyclohexa-1,3-diene]; gamma-terpinene [1-methyl-4-propan-2-ylcyclohexa-1,4-diene]; alpha-terpineol [2-(4-methylcyclohex-3-en-1-yl)propan-2-ol]; gamma.-terpineol [1-methyl-4-propan-2-ylidenecyclohexan-1-ol]; (+)-valencene [(3R,4aS,5R)-4a,5-dimethyl-3-prop-1-en-2-yl-2,3,4,5,6,7-hexahydro-1H-naphthalene]; and combinations thereof.

In certain embodiments, the composition includes four or more terpene isolates selected from limonene, linalool, myrcene, humulene, caryophyllene, β-caryophyllene, α-pinene, β-pinene, α-phellandrene, Δ3-carene, α-terpinene, β-phellandrene, cis-ocimene, terpinolene, α-guaiene, δ-guaiene, elemene, guaiol, γ-eudesmol, β-eudesmol, agarospirol, bulnesol, and α-bisabolol. In yet further embodiments, the composition includes a combination of at least four, five, six, seven, eight, nine, or ten terpenes. In certains embodiments, the composition includes limonene, linalool, myrcene, and alpha-pinene.

A terpene or combination of terpenes may be present in a pharmaceutical composition in an amount suitable for its intended use. In certain embodiments, the composition includes a terpene or combination of terpenes in an amount of, e.g., about 0.1 mg/ml, about 0.5 mg/ml, about 1.0 mg/ml, about 2 mg/ml, about 5 mg/ml, about 10 mg/ml, about 20 mg/ml, about 25 mg/ml, about 50 mg/ml, about 75 mg/ml, about 100 mg/ml, about 125 mg/ml, about 150 mg/ml. In certain embodiments, the composition includes a terpene or combination of terpenes in an amount of, e.g., about 1 mg/ml to about 25 mg/ml, about 1 mg/ml to about 5 mg/ml, about 5 mg/ml to about 10 mg/ml, about 10 mg/ml to about 15 mg/ml, about 15 mg/ml to about 20 mg/ml, or about 20 mg/ml to about 25 mg/ml. In other embodiments of this embodiment, a pharmaceutical composition includes a terpene or combination of terpenes in an amount of, e.g., at least 0.1 mg/ml, at least 0.5 mg/ml, at least 1.0 mg/ml, at least 2 mg/ml, at least 5 mg/ml, at least 10 mg/ml, at least 20 mg/ml, at least 25 mg/ml, at least 50 mg/ml, at least 75 mg/ml, at least 100 mg/ml, at least 125 mg/ml, at least 150 mg/ml. In yet other embodiments of this embodiment, a pharmaceutical composition includes a terpene or combination of terpenes in an amount of, e.g., at most 0.1 mg/ml, at most 0.5 mg/ml, at most 1.0 mg/ml, at most 2 mg/ml, at most 5 mg/ml, at most 10 mg/ml, at most 20 mg/ml, at most 25 mg/ml, at most 50 mg/ml, at most 75 mg/ml, at most 100 mg/ml, at most 125 mg/ml, at most 150 mg/ml. In certain embodiments, the composition includes individual terpenes at concentrations from 1 to 25 mg/ml. In yet a further embodiment, limonene, linalool, myrcene, and alpha-pinene are each present in the composition at concentration ranging from 1 to 25 mg/ml.

In yet other embodiments, a composition is provided having a terpene or a combination of terpenes in an amount ranging from 0.01% to 20% w/v. In certain embodiments, a composition includes a terpene or a combination of terpenes in an amount of about 0.01%, about 0.5% w/v, about 0.75% w/v, about 1% w/v, about 2% w/v, about 3% w/v, about 4% w/v, about 5% w/v, about 6% w/v, about 7% w/v, about 8% w/v, about 9% w/v, about 10% w/v, about 11% w/v, about 12% w/v, about 13% w/v, about 14% w/v, about 15% w/v, about 16% w/v, about 17% w/v, about 18% w/v, about 19% w/v, or about 20% w/v. In certain embodiments, a composition includes a terpene or a combination of terpenes in an amount of at least 0.5% w/v, at least 0.75% w/v, at least 1% w/v, at least 2% w/v, at least 3% w/v, at least 4% w/v, at least 5% w/v, at least 6% w/v, at least 7% w/v, at least 8% w/v, at least 9% w/v, at least 10% w/v, at least 11% w/v, at least 12% w/v, at least 13% w/v, at least 14% w/v, at least 15% w/v, at least 16% w/v, at least 17% w/v, at least 18% w/v, at least 19% w/v, or at least 20% w/v.

Thus, for example, in certain embodiments, the composition includes one or more of limonene, linalool, myrcene, and alpha-pinene, wherein each terpene is found at a concentration from 0.01% to 20% (w/v).

Compositions provided herein include an oil-based solvent. In certain embodiments, the oil-based solvent is olive oil-NF grade. In other embodiments, the oil-based solvent includes medium-chain triglycerides (MCT) fractionated from coconut oil, hemp oil, sunflower oil, olive oil, corn oil, or sesame oil, including mixtures thereof. MCT derived from coconut oil are used pharmaceutically as an emulsifying agent, solvent, suspending agent, and as a therapeutic agent and regarded as generally nontoxic and nonirritant (see, e.g., Handbook of Pharmaceutical Excipients, $5^{th}$ edition) and are classified as Generally Recognized as Safe (GRAS) as a pharmaceutical excipient by the US Food and Drug Administration. In certain embodiments, the oil-based solvent is olive oil.

In certain embodiments, a composition is provided having an oil-based solvent in an amount ranging from 1% to 75% w/v. In certain embodiments, a composition is provided having an oil-based solvent in an amount ranging from 1% to 10% w/v, 10% to 20% w/v, 20% to 30% w/v, 30% to 40% w/v, 40% to 50% w/v, or 60% to 70% w/v or 70% to 75% w/v. In certain embodiments, a composition includes an oil-based solvent in an amount of about 1% w/v, about 5% w/v, about 10% w/v, about 2% w/v, about 3% w/v, about 4% w/v, about 5% w/v, about 6% w/v, about 7% w/v, about 8% w/v, about 9% w/v, about 10% w/v, about 11% w/v, about 12% w/v, about 13% w/v, about 14% w/v, about 15% w/v, about 16% w/v, about 17% w/v, about 18% w/v, about 19% w/v, or about 20% w/v. In certain embodiment, olive oil is present at 20% w/v.

Pharmaceutical compositions may be formulated for any appropriate route of administration. For example, compositions may be formulated for intravenous, parenteral, subcutaneous, intramuscular, intratumoral, intracranial, intraorbital, ophthalmic, intraventricular, intracapsular, intraspinal, intracisteral, intraperitoneal, intranasal, or aerosol administration.

In certain embodiments, the composition includes a nanoemulsion comprising about 6% w/v cannabidiol, about 0.1% w/v polysorbate-80, about 20% w/v olive oil, about 0.25% w/v limonene, about 0.25% w/v linalool, about 0.25% w/v myrcene, and about 0.25% w/v alpha-pinene, and about 72.9% w/v water, and optionally is formulated for intravenous delivery to a subject.

In certain embodiments, the composition provided is a nanoemulsion resulting from a process that includes heating one or more cannabinoid isolate(s) to a temperature of at least 80 degrees Celsius and mixing the heated cannabinoid isolate with olive oil NF-grade, where the resulting combination is homogenized via a thermomixer at least 100 rpm and 80 degrees Celsius and added to a solution containing at least one non-ionic surfactant (e.g., polysorbate-80), sterile water USP-grade, and at least four terpene isolates (e.g., limonene, linalool, myrcene, and alpha-pinene), mixing (e.g. vortexing) and then emulsifying and/or micro-shearing for at least ten (10) cycles via an emulsion chamber to generate water-soluble nanoparticles ranging up to 900 nm. In certain embodiments, the ingredients are emulsified and/or micro-sheared for at least twenty-five (25) cycles. In other embodiments, as an alternative to or in combination with emulsifying and/or micro-shearing the combination, repeat sonification of the ingredients is performed for at least ten (10) cycles at least twenty (20) microns per cycle to generate water-soluble nanoparticles up to 900 nm in diameter.

In certain embodiments, the composition is formulated for oral (including, e.g., sublingual) and/or topical administration. In certain embodiments, the pharmaceutical compositions provided herein for oral and/or topical administration are provided in solid, semisolid, or liquid dosage forms for oral administration. As used herein, oral administration also includes buccal, lingual, and sublingual administration. Suitable dosage forms include, but are not limited to, tablets, sprays, creams, sublingual or buccal films (i.e., "fast-melts"), chewable tablets, effervescent tablets, dispersible tablets, mini-tablets, capsules, pills, strips, troches, lozenges, pastilles, oral film, cachets, pellets, medicated chewing gum, bulk powders or granules, effervescent or non-effervescent powders or granules, oral mists, solutions, emulsions, suspensions, wafers, sprinkles, elixirs, and syrups. In addition to the active ingredient, the pharmaceutical compositions can contain one or more pharmaceutically acceptable carriers or excipients including, but not limited to, binders, fillers, diluents, disintegrants, wetting agents, surfactants, lubricants, glidants, pH-modifiers, coloring agents, dye-migration inhibitors, sweetening agents, flavoring agents, emulsifying agents, suspending and dispersing agents, preservatives, solvents, solvating agents, non-aqueous liquids, organic acids, and sources of carbon dioxide. In certain embodiments, the pharmaceutical preparations for oral are formulated into liquid preparations such as syrups, elixirs, and concentrated drops. The oral dosage formulations may also contain disintegrating agents, such as the cross-linked polyvinylpyrrolidone, agar, or alginic acid, or a salt thereof such as sodium alginate; a lubricant, such as talc or magnesium stearate; a plasticizer, such as glycerol or sorbitol; a sweetening such as sucrose, fructose, lactose, or aspartame; a natural or artificial flavoring agent. Oral fluids such as solutions, syrups and elixirs can be prepared in dosage unit form so that a given quantity contains a predetermined amount of the compound.

The terms "pharmaceutical formulation" and "pharmaceutical composition" refers to a preparation which is in such form as to permit the biological activity of an active ingredient contained therein to be effective, and which contains no additional components which are unacceptably toxic to a subject to which the formulation would be administered.

The phrase "pharmaceutically acceptable" refers to those compounds, materials, excipients, compositions, and/or dosage forms that are, within the scope of sound medical judgment, suitable for use in contact with the tissues of a subject without excessive toxicity, irritation, allergic response, or other problems or complications commensurate with a reasonable benefit/risk ratio. A "pharmaceutically acceptable carrier" includes, but is not limited to, a buffer, excipient, stabilizer, or preservative.

The term "active pharmaceutical ingredient" (API) is used herein in a manner consistent with how this term is defined by the FDA, which identifies it as "any substance or mixture of substances intended to be used in the manufacture of a drug product and that, when used in the production of a drug, becomes an active ingredient in the drug product. Such substances are intended to furnish pharmacological activity or other direct effect in the diagnosis, cure, mitigation, treatment or prevention of disease or to affect the structure and function of the body." As such a synergistic combination falls under the definition of an API. Accordingly, in certain embodiments, provided hererin are injectable active pharmaceutical ingredient (API) nanoemulsion drug compositions containing API-grade isolate phytocannabinoids and a hydro-lipid emulsion excipient complex.

Methods and agents well known in the art for making pharmaceutical formulations are described, for example, in "Remington's Pharmaceutical Sciences," Mack Publishing Company, Easton, Pa. Formulations may, for example, contain excipients, carriers, stabilizers, or diluents such as sterile water, saline, polyalkylene glycols such as polyethylene glycol, oils of vegetable origin, or hydrogenated napthalenes, preservatives (such as octadecyldimethylbenzyl, ammonium chloride, hexamethonium chloride, benzalkonium chloride, benzethonium chloride, phenol, butyl or benzyl alcohol, alkyl parabens such as methyl or propyl paraben, catechol, resorcinol, cyclohexanol, 3-pentanol, and m-cresol), low molecular weight polypeptides, proteins such as serum albumin, gelatin, or immunoglobulins, hydrophilic polymers such as polyvinylpyrrolidone, amino acids such as glycine, glutamine, asparagine, histidine, arginine, and lysine, monosaccharides, disaccharides, and other carbohydrates including glucose, mannose, and dextrins, chelating agents such as EDTA, sugars such as sucrose, mannitol, trehalose or sorbitol; salt-forming counter-ions such as sodium; metal complexes (e.g. Zn-protein complexes); and/or non-ionic surfactants such as TWEEN™, PLURONICS™ (poloxamers), polyethylene glycol (PEG), polysorbate-20, polysorbate-60, and polysorbate-80. Active ingredients may also be entrapped in microcapsules prepared, for example, by coacervation techniques or by interfacial polymerization, for example, hydroxymethylcellulose or gelatin-microcapsules and poly-(methylmethacylate) microcapsules, respectively, in colloidal drug delivery systems (for example, liposomes, albumin microspheres, microemulsions, nanoparticles and nanocapsules) or in macroemulsions. Such techniques are disclosed in Remington's Pharmaceutical Sciences 16th edition, Osol, A. Ed. (1980).

Methods

As used herein, the term "treatment," and variations thereof such as "treat" or "treating," refers to clinical intervention in an attempt to alter the natural course of the individual being treated and can be performed either for prophylaxis or during the course of clinical pathology. Desirable effects of treatment include, but are not limited to, preventing or reducing the occurrence or recurrence of disease, alleviation of symptoms, diminishment of any direct or indirect pathological consequences of the disease, decreasing the rate of disease progression, amelioration or palliation of the disease state, and remission or improved prognosis. In certain embodiments, compositions described herein are used to delay development of a disease or to slow the progression of a disease.

Likewise, as used herein, the term "treatment of cancer" or "treating cancer" can be described by a number of different parameters including, but not limited to, reduction in the size of a tumor in an animal having cancer, reduction in the growth or proliferation of a tumor in an animal having cancer, preventing metastasis or reducing the extent of metastasis, and/or extending the survival of an animal having cancer compared to control. In certain embodiments, treatment results in a reduced risk of distant recurrence or metastasis.

Therapeutic benefits or beneficial effects provided by the methods described herein may be objective or subjective, transient, temporary, or long-term improvement in the condition or pathology, or a reduction in onset, severity, duration or frequency of an adverse symptom associated with or caused by cell proliferation or a cellular hyperproliferative disorder such as a neoplasia, tumor or cancer, or metastasis. A satisfactory clinical endpoint of a treatment method in accordance with the invention is achieved, for example, when there is an incremental or a partial reduction in severity, duration or frequency of one or more associated pathologies, adverse symptoms or complications, or inhibition or reversal of one or more of the physiological, biochemical or cellular manifestations or characteristics of cell proliferation or a cellular hyperproliferative disorder such as a neoplasia, tumor, or cancer, or metastasis. A therapeutic benefit or improvement therefore be a cure, such as destruction of target proliferating cells (e.g., neoplasia, tumor or cancer, or metastasis) or ablation of one or more, most or all pathologies, adverse symptoms or complications associated with or caused by cell proliferation or the cellular hyperproliferative disorder such as a neoplasia, tumor or cancer, or metastasis. However, a therapeutic benefit or improvement need not be a cure or complete destruction of all target proliferating cells (e.g., neoplasia, tumor or cancer, or metastasis) or ablation of all pathologies, adverse symptoms or complications associated with or caused by cell proliferation or the cellular hyperproliferative disorder such as a neoplasia, tumor or cancer, or metastasis. For example, partial destruction of a tumor or cancer cell mass, or a stabilization of the tumor or cancer mass, size or cell numbers by inhibiting progression or worsening of the tumor or cancer, can reduce mortality and prolong lifespan even if only for a few days, weeks or months, even though a portion or the bulk of the tumor or cancer mass or cells remain.

As used herein, the terms "increased duration of survival" or "increased survival" refers to the propensity of a patient with a disease or condition to live longer than predicted compared to another patient diagnosed with the same disease or condition. Survival may be, for example, survival without progression of the disease or cancer or overall patient survival. In certain embodiments, increased survival refers to the time interval between date of diagnosis or first treatment (such as surgery or first chemotherapy) and a specified event, such as relapse, metastasis, or death. Overall survival is the time interval between the date of diagnosis or first treatment and date of death or date of last follow up. Relapse-free survival is the time interval between the date of diagnosis or first treatment and date of a diagnosed relapse (such as a locoregional recurrence) or date of last follow up. Metastasis-free survival is the time interval between the date of diagnosis or first treatment and the date of diagnosis of a metastasis or date of last follow The term "enhance the immune response" or "increase the immune response" or grammatical variations thereof include modulating the immune system of an individual having cancer or an infectious disease, or a subject receiving a vaccination. Modulating includes, e.g., increasing an immune cell response or function, decreasing inflammation, inhibiting T regulatory cell activity, increasing an antibody response, and combinations thereof. In some instances, an enhanced immune response as a result of administering the compositions described herein allows for a therapeutic agent or vaccine (especially one delivered in combination with a composition provided herein) to be more efficacious at a lower dose. In some instances, an enhanced immune response is an increase in a T cell response targeting cancerous or infected cells.

By "administering" or "route of administration" is meant delivery of composition described herein to the subject. Routes of administration may be combined, if desired. In some embodiments, the administration is repeated periodically. In certain embodiments, compositions described herein are co-administered or a composition described herein is administered with another therapeutic agent, including for example, a chemotherapy or immunotherapy. Where compositions are co-administered, they may be formulated together or separately to be delivered to the subject essentially simultaneously by the same or different route. In certain embodiments, the time period between administering the compositions to a subject may be shorter than 1 hour, 2 hours, 4 hours, 8 hours, 12 hours, 24 hours, or 48 hours. In certain embodiments, the compositions described herein are administered to a subject in need thereof one or more times. In certain embodiments, one, two, three or more re-administrations are permitted daily.

Routes of administration may be selected, e.g., from oral, inhalation, intranasal, intratracheal, intraarterial, intraocular, intravenous, intramuscular, intraperitoneal, intratumoral, and other parenteral routes. Accordingly, pharmaceutical compositions may be formulated as described herein for any appropriate route of administration, for example, in the form of liquid solutions or suspensions (as, for example, for intravenous administration, for oral administration, etc.).

The pharmaceutical compositions described herein may be administered on a routine schedule (e.g., hourly, daily, every 3 days, weekly, monthly, yearly) or according to a cyclic schedule (e.g., 1 week of daily administration, 2 consecutive weeks without administration, or 3 consecutive weeks of daily administration, 3 consecutive weeks without administration, or 4 consecutive weeks of daily administration, 5 consecutive weeks without administration, and repeating the cycles as necessary). In embodiments where the composition is administered on a cyclic schedule, the time interval of consecutive daily administration can include 1 day, 2 days, 3 days, 4 days, 5 days, 6 days, 7 days, 2 weeks, 3, weeks, 4 weeks, or 2 months, and the time intervals of not administering a composition can include 1 day, 2 days, 3 days, 4 days, 5 days, 6 days, 7 days, 2 weeks, 3, weeks, 4 weeks, 2 months, 3 months, 4 months, 5 months, 6 months, or a year wherein the days of successive administration and non-administration are independently selected. In certain embodiments, the methods include administering various or altered dosages of the compositions over the course of a treatment schedule.

In some embodiments, a pharmaceutical composition is administered orally or sublingually e.g., in a dose in the range of from about 0.5 to about 500 milligrams (mg) of the composition per kg of subject body weight, from about 0.5 to about 1 mg/kg, from about 1 to about 5 mg/kg body weight, from about 1 to about 10 mg/kg body weight from about 5 to about 10 mg/kg body weight, from about 5 to about 15 mg/kg body weight, from about 10 to about 20 mg/kg body weight, from about 15 to about 20 mg/kg body weight, from about 20 to about 25 mg/kg body weight, from about 25 to about 30 mg/kg body weight, from about 30 to about 35 mg/kg body weight, from about 35 to about 40 mg/kg body weight, from about 40 to about 45 mg/kg body weight, from about 45 to about 50 mg/kg body weight, from about 55 to about 100 mg/kg body weight, from about 110 to about 500 mg/kg body weight. In particular embodiments, the dose is about 0.5, 1, 2, 5, 7.5, 10, 15, 20, 25, 30, 35, 40, 45, 50, 75, 100, 150, 250, or 500 mg/kg body weight. The dose can be administered once per day or divided into sub-doses and administered in multiple doses, e.g., twice, three times, or four times per day. However, as will be appreciated by a skilled artisan, oral compositions described herein may be administered in different amounts and at different times.

In certain embodiments, a composition provided herein is administered to a subject to improve immune function. In certain embodiments, methods for increasing an immune cell population following administration of a composition are provided, wherein the cell population is one or more of B cells, T cells, monocytes, macrophages, neutrophils, cytotoxic T cells, mast cells, basophils, eosinophils, megakaryocytes, platelets, dendritic cells, natural killer cells, plasma cells and hematopoietic stem cells, or a subpopulation thereof. An increase in an immune cell population can be measured, for example, as an absolute cell number in a biological sample (e.g., peripheral blood or bone marrow) or as a relative frequency or percentage in a population of cells or relative to another population of immune cells in a sample, as determined using methods that are well known to those of skill in the art (including, e.g. flow cytometric analysis; see, example, Michael Brown and Carl Wittwer. Flow Cytometry: Principles and Clinical Applications in Hematology, Clinical Chemistry; 2000; 46:8(B) 1221-1229; Finak, Greg et al. "Standardizing Flow Cytometry Immunophenotyping Analysis from the Human ImmunoPhenotyping Consortium" Scientific reports vol. 6 20686. 10 Feb. 2016, doi:10.1038/srep20686PMCID: PMC4748244; and Yu Y-RA, O'Koren E G, Hotten D F, Kan M J, Kopin D, Nelson E R, et al. (2016) A Protocol for the Comprehensive Flow Cytometric Analysis of Immune Cells in Normal and Inflamed Murine Non-Lymphoid Tissues. PLoS ONE 11(3): e0150606. https://doi.org/10.1371/journal.pone.0150606). Thus, an increase in an immune cell population may be reflected, e.g., as an altered ratio, percentage, fraction, and/or absolute cell number. Further, an increase may be relative a sample from the same or a different subject (including a biological sample from the same subject before administering a composition described herein, following administration of composition described herein, or during a course of multiple administrations of one or more compositions described herein). Thus, in certain embodiments, measurements of one or more cell populations are determined before and after administering a composition provided herein to determine whether there has been an increase. An increase in an immune cell population may be at least 2%, at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, at least 100% relative to, for example, a pre-administration or control sample.

In certain embodiments, the compositions provided herein are administered to a subject to produce one or more of: an increase in B cell antigen receptor stimulation, Toll-like receptor stimulation in B cells, levels of serum antibodies, and/or levels of mucosal antibodies, increased T cell receptor stimulation, increased T cell co-receptor stimulation, and/or increased CD8 T cell cytotoxic activity, increased monocyte functions such as 1) chemotaxis, 2) opsonization, 3) phagocytosis, 4) phagocytosis-induced metabolic stimulation, and 5) destruction of foreign material (see, for example, Weston W L, Dustin R D, Hecht S K. Quantitative assays of human monocyte-macrophage function. J Immunol Methods. 1975 September; 8(3):213-22), increased production of pro-inflammatory cytokines, such as TNFα, IL-1β, IL-6, IL-8, and IL-12 (see for example, Zhou, Xin et al. "Conceptual and methodological issues relevant to cytokine and inflammatory marker measurements in clinical research" Current opinion in clinical nutrition and metabolic care vol. 13,5 (2010): 541-7) by macrophages upon stimulation with bacterial lipoproteins or lipopolysaccharides, or increased surface expression of CD80, CD86, or class II MHC on macrophages following stimulation with bacterial lipoproteins, lipopolysaccharides, CpG DNA, R848, a TLR7/8 agonist, or peptidoglycan, increased natural killer cell function (see, for example, Abel, Alex M et al. "Natural Killer Cells: Development, Maturation, and Clinical Utilization" Frontiers in immunology vol. 9 1869. 13 Aug. 2018, doi:10.3389/fimmu.2018.01869), increased antigen presentation by dendritic cells, increased surface expression of CD80, CD86, or class II MHC on dendritic cells following stimulation with bacterial lipoproteins, lipopolysaccharides, CpG DNA, a TLR7/8 agonist (e.g., R848), or peptidoglycan, increased bacterial killing capacity of neutrophils, increased production of reactive oxygen species by neutrophils, increased expression of opsonophagocytic receptors on neutrophils, and increased expression of complement receptors on neutrophils. Thus, the compositions can be administered to a subject when enhancing an immune response is desired in various contexts, including for example as a vaccine adjuvant, to treat an immunocompromised subject (e.g. as a result of chemotherapy), or to enhance an anti-tumor response.

Accordingly, in certain embodiments, methods of enhancing or improving an immune response in a subject are provided. The methods include administering to the subject a composition disclosed herein such that the immune response in the subject is enhanced or improved. In one embodiment, the subject has, or is at risk of, having a disorder described herein, e.g., a cancer or an infectious disorder as described herein. In certain embodiments, the methods include administering to the subject a composition as provided herein in combination with one or more anti-tumor agent, chemotherapeutic agent, or cancer immunotherapy (e.g., a combination including a therapeutically effective amount of an anti-PD-1, anti-PD-L1, anti-CTLA-4, anti-CD19, anti-BAFFR, or anti-CD20 antibody molecule), such that the anti-tumor response is increased. In certain embodiments, the subject is, or is at risk of being, immunocompromised. For example, the subject is undergoing or has undergone a chemotherapeutic treatment and/or radiation therapy. Alternatively, or in combination, the subject is, or is at risk of being, immunocompromised as a result of an infection.

In one aspect, a method of treating (e.g., one or more of reducing, inhibiting, or delaying progression of) a cancer or a tumor in a subject is provided. The method includes administering to the subject a composition disclosed herein. In certain embodiments, the method includes administering a composition that having a nanoemulsion with a phytocannabinoid isolate and terpene isolates. In yet a further embodiment, the method includes administering to a subject a composition that includes a nanoemulsion with about 6% w/v cannabidiol, about 0.1% w/v polysorbate-80, about 20% w/v olive oil, about 0.25% w/v limonene, about 0.25% w/v linalool, about 0.25% w/v myrcene, and about 0.25% w/v alpha-pinene. In certain embodiments, the method includes administering a composition formulated for intravenous administration.

In one aspect, method includes administering a therapeutically effective amount of a cancer immunotherapy such as an antigen-specific immunotherapeutic agent, including a compound or composition designed to stimulate the immune system to specifically recognize antigens expressed or overexpressed by infected or cancerous cells. Non-limiting examples of antigen-specific immunotherapeutic agents include vaccines (e.g., peptide vaccines), antibodies, chimeric antigen receptor T cells (CAR-T cells), and combinations thereof. In particular embodiments, the antigens presented by infected or cancerous cells are highly specific to each disease or condition, and the vaccines, antibodies, and/or CAR-T cells used is dependent on the disease or condition being treated. In certain embodiments, the methods include administering an antibody molecule that specifically binds PD-1, PD-L1, CTLA-4, CD19, CD20, BAFFR, TACI, APRILR, or BCMA in combination with a composition described herein. In certain embodiments, the administration of the combination of the composition and an immunotherapy (i.e., an antibody for PD-1, PD-L1, CTLA-4, CAR-T cells) has synergistic effects on, for example, an anti-tumor response or the function or an increase in an immune cell population.

Programmed Death 1 (PD-1) protein is an inhibitory member of the extended CD28/CTLA-4 family of T cell regulators (Okazaki et al. (2002) Curr Opin Immunol 14: 391779-82; Bennett et al. (2003) J. Immunol. 170:711-8). Other members of the CD28 family include CD28, CTLA-4, ICOS and BTLA. PD-1 is suggested to exist as a monomer, lacking the unpaired cysteine residue characteristic of other CD28 family members. PD-1 is expressed on activated B cells, T cells, and monocytes. The PD-1 gene encodes a 55 kDa type I transmembrane protein (Agata et al. (1996) Int Immunol. 8:765-72). Although structurally similar to CTLA-4, PD-1 lacks the MYPPY motif (SEQ ID NO: 236) that is important for B7-1 and B7-2 binding. Two ligands for PD-1 have been identified, PD-L1 (B7-H1) and PD-L2 (B7-DC), that have been shown to downregulate T cell activation upon binding to PD-1 (Freeman et al. (2000) J. Exp. Med. 192:1027-34; Carter et al. (2002) Eur. J. Immunol. 32:634-43). Both PD-L1 and PD-L2 are B7 homologs that bind to PD-1, but do not bind to other CD28 family members. PD-L1 is abundant in a variety of human cancers (Dong et al. (2002) Nat. Med. 8:787-9).

In certain embodiments, delivery of a PD-1, PD-L1, CTLA-4, or CD20 antibody inhibits, reduces or neutralizes one or more activities of the target ligand or cell type, resulting, e.g., in blockade or reduction of an immune checkpoint or elimination of a target cell by antibody-dependent cellular cytotoxicity (ADCC). Thus, such combinations can be used to treat a subject where enhancing an immune response in the subject is desired. In certain embodiments, the enhanced immune response includes an increase in antigen presentation, an increase in an effector T cell function (e.g., one or more of T cell proliferation, IFN-gamma secretion, or cytolytic function), inhibition of a regulatory T cell function, an effect on the activity of multiple cell types, such as regulatory T cells, effector T cells, and NK cells), an increase in tumor infiltrating lymphocytes, an increase in T-cell receptor mediated proliferation, and/or a decrease in immune evasion by cancerous cells.

In yet another embodiment, a composition provided herein is administered to a subject in combination with an antibody that specifically binds CD20 to enhance antibody-dependent cellular cytotoxicity (ADCC) by, for example, NK cells and/or macrophages where the subject has a B cell lymphoma.

In certain embodiments, the cancer treated includes, but is not limited to, a solid tumor, a hematological cancer (e.g., leukemia, lymphoma, myeloma, e.g., multiple myeloma), and a metastatic lesion. In one embodiment, the cancer is a solid tumor. Examples of solid tumors include malignancies, e.g., sarcomas and carcinomas, e.g., adenocarcinomas of the various organ systems, such as those affecting the lung, breast, ovarian, lymphoid, gastrointestinal (e.g., colon), anal, genitals and genitourinary tract (e.g., renal, urothelial, bladder cells, prostate), pharynx, CNS (e.g., brain, neural or glial cells), head and neck, skin (e.g., melanoma or Merkel cell carcinoma), and pancreas, as well as adenocarcinomas which include malignancies such as colon cancers, rectal cancer, renal-cell carcinoma, liver cancer, non-small cell lung cancer, cancer of the small intestine, cancer of the esophagus. The cancer may be at an early, intermediate, late stage or metastatic cancer.

In one embodiment, the cancer is chosen from a lung cancer (e.g., a non-small cell lung cancer (NSCLC) (e.g., a NSCLC with squamous and/or non-squamous histology, or a NSCLC adenocarcinoma)), a skin cancer (e.g., a Merkel cell carcinoma or a melanoma (e.g., an advanced melanoma)), a kidney cancer (e.g., a renal cancer (e.g., a renal cell carcinoma (RCC) such as a metastatic RCC or clear cell renal cell carcinoma (CCRCC)), a liver cancer, a myeloma (e.g., a multiple myeloma), a prostate cancer (including advanced prostate cancer), a breast cancer (e.g., a breast cancer that does not express one, two or all of estrogen receptor, progesterone receptor, or Her2/neu, e.g., a triple negative breast cancer), a colorectal cancer, a pancreatic cancer, a head and neck cancer (e.g., head and neck squamous cell carcinoma (HNSCC), a brain cancer (e.g., a glioblastoma), an endometrial cancer, an anal cancer, a gastro-esophageal cancer, a thyroid cancer (e.g., anaplastic thyroid carcinoma), a cervical cancer, a neuroendocrine tumor (NET) (e.g., an atypical pulmonary carcinoid tumor), a lymphoproliferative disease (e.g., a post-transplant lymphoproliferative disease) or a hematological cancer, T-cell lymphoma, B-cell lymphoma, a non-Hogdkin lymphoma, or a leukemia (e.g., a myeloid leukemia or a lymphoid leukemia).

In yet another embodiment, the cancer is a hepatocarcinoma, e.g., an advanced hepatocarcinoma, with or without a viral infection, e.g., a chronic viral hepatitis.

In a certain embodiment, a composition provided herein is administered alone or in combination with another cancer treatment or therapeutic agent to reduce or inhibit metastasis. The reduction or inhibition of metastasis can be measured relative to the incidence observed in the absence of the treatment and, in further testing, inhibits metastatic tumor growth. The tumor inhibition can be quantified using any convenient method of measurement. The incidence of metastasis can be assessed by examining relative dissemination (e.g., number of organ systems involved) and relative tumor burden in these sites. Metastatic growth can be ascertained by microscopic or macroscopic analysis, as appropriate. Tumor metastasis can be reduced by about 10%, 20%, 30%, 40%, 50%, 60%, 70%, 80%, 90%, 95% or greater.

Chemotherapeutic agents (e.g., anti-cancer agents) are well known in the art and include, but are not limited to, anthracenediones (anthraquinones) such as anthracyclines (e.g., daunorubicin (daunomycin; rubidomycin), doxorubicin, epirubicin, idarubicin, and valrubicin), mitoxantrone, and pixantrone; platinum-based agents (e.g., cisplatin, carboplatin, oxaliplatin, satraplatin, picoplatin, nedaplatin, triplatin, and lipoplatin); tamoxifen and metabolites thereof such as 4-hydroxytamoxifen (afimoxifene) and N-desmethyl-4-hydroxytamoxifen (endoxifen); taxanes such as paclitaxel (taxol) and docetaxel; alkylating agents (e.g., nitrogen mustards such as mechlorethamine (HN2), cyclophosphamide, ifosfamide, melphalan (L-sarcolysin), and chlorambucil); ethylenimines and methylmelamines (e.g., hexamethylmelamine, thiotepa, alkyl sulphonates such as busulfan, nitrosoureas such as carmustine (BCNU), lomustine (CCNLJ), semustine (methyl-CCN--U), and streptozoein (streptozotocin), and triazenes such as decarbazine (DTIC; dimethyltriazenoimidazolecarboxamide)); antimetabolites (e.g., folic acid analogues such as methotrexate (amethopterin), pyrimidine analogues such as fluorouracil (5-fluorouracil; 5-FU), floxuridine (fluorodeoxyuridine; FUdR), and cytarabine (cytosine arabinoside), and purine analogues and related inhibitors such as mercaptopurine (6-mercaptopurine; 6-MP), thioguanine (6-thioguanine; 6-TG), and pentostatin (2'-deoxycofonnycin)); natural products (e.g., vinca alkaloids such as vinblastine (VLB) and vincristine, epipodophyllotoxins such as etoposide and teniposide, and antibiotics such as dactinomycin (actinomycin D), bleomycin, plicamycin (mithramycin), and mitomycin (mitomycin Q); enzymes such as L-asparaginase; biological response modifiers such as interferon alpha); substituted ureas such as hydroxyurea; methyl hydrazine derivatives such as procarbazine (N-methylhydrazine; MIH); adrenocortical suppressants such as mitotane (o,p'-DDD) and aminoglutethimide; analogs thereof derivatives thereof and combinations thereof.

In one embodiment, the cancer is a melanoma, e.g., an advanced melanoma. In yet another embodiment, the cancer is an advanced or unresectable melanoma that does not respond to other therapies. In certain embodiments, the cancer is a drug resistant cancer. In a certain embodiment, the cancer is a drug resistant melanoma. In another embodiment, the cancer is a melanoma with a BRAF mutation (e.g., a BRAF V600 mutation). In yet other embodiments, the methods include administering a composition disclosed herein in combination with an anti-CTLA-4 antibody (e.g., ipilimumab) with or without a BRAF inhibitor (e.g., vemurafenib or dabrafenib).

In certain embodiments, a composition provided herein is administered in combination with an inhibitor of one or more of MAPK, BRAF, and MEK for the treatment of cancer. The mitogen-activated protein kinase (MAPK) is activated by various pro-inflammatory and stressful stimuli. The MAPK pathway is frequently activated in human cancers, leading to malignant phenotypes, such as autonomous cellular proliferation. The MAPK signaling cascade is involved in various biological responses other than inflammation such as cell proliferation, differentiation, apoptosis and invasion, leading to the use of MAPK inhibitors for the treatment of cancer. As used herein, "MAPK inhibitor" includes any agent which inhibits, downregulates or decreases activity of any component of the MAPK signaling pathway, including BRAF, MEK, ERK, etc. See, Nikiforov, Y., Thyroid carcinoma: molecular pathways and therapeutic targets, Modem Pathology, 2008, 21: S37-43, which is incorporated herein by reference.

As used described, the term "BRAF" refers to a human gene that makes a protein called B-Raf. The B-Raf protein is involved in sending signals inside cells, which are involved in directing cell growth. In 2002, it was shown to be mutated in human cancers. Drugs that treat cancers driven by BRAF have been developed. Vemurafenib, is one BRAF inhibitor drug that was approved by FDA for treatment of late-stage melanoma. Other specific inhibitors of mutated B-Raf protein for anticancer use (as used herein "BRAF inhibitors") are known. These include: GDC-0879, PLX-4720, sorafenib tosylate, dabrafenib, and LGX818. Thus, in one embodiment, the BRAF inhibitor is vemurafenib, dabrafenib, GDC-0879, PLX-4720, sorafenib tosylate, LGX818, or any combination thereof.

As used herein, the term "MEK" refers to the mitogen-activated protein kinase kinase enzymes MEK1 and/or MEK2. MEK is a kinase enzyme which phosphorylates mitogen-activated protein kinase. MEK is a member of the MAPK signaling cascade that is activated in melanoma. When MEK is inhibited, cell proliferation is blocked and apoptosis (controlled cell death) is induced.

The term "MEK inhibitor" refers to a chemical or drug that inhibits the mitogen-activated protein kinase kinase enzymes MEK1 and/or MEK2. They can be used to affect the MAPK/ERK pathway which is often overactive in some cancers. Hence MEK inhibitors have potential for treatment of some cancers, especially BRAF-mutated melanoma, and KRAS/BRAF mutated colorectal cancer. MEK inhibitors include but are not limited to: trametinib (GSK1120212), selumetinib, RO5068760, MEK162, PD-325901, cobimetinib or XL518 and CI-1040 or PD035901.

Several MAPK inhibitors are either approved for, or are in clinical trials for, use in cancer therapy. Others are described in publications such as Wang et al, Clinical experience of MEK inhibitors in cancer therapy, Biochimica et Biophysica Acta—Molecular Cell Research, 1773(8): 1248-55 (August 2007), which is incorporated herein by reference. In one embodiment, the MAPK inhibitor is sorafenib. Sorafenib is a small molecular inhibitor of several tyrosine protein kinases (VEGFR and PDGFR) (tyrosine kinase inhibitor or TKI) and Raf kinases (more avidly C-Raf than B-Raf). Sorafenib also inhibits some intracellular serine/threonine kinases (e.g. C-Raf, wild-type B-Raf and mutant B-Raf). Sorafenib treatment induces autophagy, which may suppress tumor growth. Sorfenib is currently approved for use in treating several cancers including renal cell carcinoma, hepatocellular carcinomas and thyroid cancer.

In another embodiment, the MAPK inhibitor is RAF265 (also called CHIR-265). RAF265 is an orally bioavailable small molecule with preclinical antitumor activity that currently is being tested in clinical trials. Much like sorafenib, in vitro kinase assays show RAF265 inhibits the activities of several intracellular kinases, including BRAF(V600E), BRAF(wild type), c-RAF, VEGF receptor 2 (VEGFR2), platelet-derived growth factor receptor (PDGFR), colony-stimulating factor (CSF)1R, RET and c-KIT, SRC, STE20, and others with IC50 ranging from less than 20 to more than 100 nmol/L. See, Su et al., RAF265 Inhibits the Growth of Advanced Human Melanoma Tumors, Clinical Cancer Research, Apr. 15, 2012, 18:2184, which is incorporated herein by reference.

In one embodiment, the MAPK inhibitor is PLX4720. In another embodiment, the MAPK inhibitor is PLX4032 (vemurafenib). PLX4720 is a structurally closely related precursor of vemurafenib. In another embodiment, the MAPK inhibitor includes PLX4720 and PLX4032. See, Michaelis et al, Differential effects of the oncogenic BRAF inhibitor PLX4032 (vemurafenib) and its progenitor PLX4720 on ABCB1 function, Journal of Pharmacy and Pharmaceutical Sciences, 2014, 17(1):154-68, which is incorporated herein by reference.

In another embodiment, the MAPK inhibitor is AZD6244 (selumetinib). Selumetinib (AZD6244) is a potent, highly selective MEK1 inhibitor with IC50 of 14 nM in cell-free assays, also inhibits ERK1/2 phosphorylation with IC50 of 10 nM, no inhibition to p38α, MKK6, EGFR, ErbB2, ERK2, B-Raf, etc. Clinical trials of selumetinib in patients with BRAFv600E/K-mutated melanoma are ongoing (see, e.g., Catalanotti et al, Phase II trial of MEK inhibitor selumetinib (AZD6244, ARRY-142886) in patients with BRAFV600E/K-mutated melanoma, Clinical Cancer Research, 2013 Apr. 15; 19(8):2257-64, which is incorporated by reference).

In another embodiment, the MAPK inhibitor is PD0325901. A second-generation oral MEK inhibitor, compound PD 0325901 demonstrates relatively minor changes in the chemical structure of PD 0325901 as compared to its predecessor CI-1040. The cyclopropylmethoxy group of CI-1040 was replaced with a (R)-dihydroxy-propoxy group and the 2-chloro substituent of CI-1040 was replaced with a 2-flouro group on the second aromatic ring, resulting in significant increases in potency. See, e.g., Wang et al., 2007, cited above.

In another embodiment, the MAPK inhibitor is LGX818 (encorafenib). Encorafenib is a novel oral small molecule kinase inhibitor with potent and selective inhibitory activity against mutant BRAF kinase. LGX818 is currently in phase 3 clinical trials for treatment of BRAF V600 mutant melanoma. LGX818 has a molecular weight of 540.01 and is property of Novartis.

In another embodiment, the MAPK inhibitor is MEK162 (binimetinib). MEK162 is a highly selective, orally bioavailable, ATP-uncompetitive inhibitor of MEK1/2. In previous preclinical work, MEK162 was found to be highly effective in inhibiting growth of xenograft tumors regardless of Ras/Raf pathway deregulation. MEK162 is currently in clinical trials for patients with RAS/RAF/MEK activated tumors. See, Ascierto et al., MEK162 for patients with advanced melanoma harboring NRAS or Val600 BRAF mutations: a non-randomized, open-label phase 2 study, Lancet Oncology, 2013 Marcg; 14(3):249-56, which is incorporated herein by reference.

In another embodiment, the MAPK inhibitor is dabrafenib. Dabrafenib acts as an inhibitor of the associated enzyme B-Raf, which plays a role in the regulation of cell growth. Dabrafenib has clinical activity with a manageable safety profile in clinical trials of phase 1 and 2 in patients with BRAF(V600)-mutated metastatic melanoma. Dabrafenib was approved as a single agent treatment for patients with BRAF V600E mutation-positive advanced melanoma. Clinical trial data demonstrated that resistance to dabrafinib and trametinib occurs within 6 to 7 months. To overcome this resistance, the BRAF inhibitor dabrafenib was combined with the MEK inhibitor trametinib. The combination of dabrafenib and trametinib has been approved by the FDA for the treatment of patients with BRAF V600E/K-mutant metastatic melanoma. Thus, in on embodiment, the MAPK inhibitor includes dabrafenib and trametinib. In another embodiment, the MAPK inhibitor is trametinib.

In yet another embodiment, the method includes in administering a phytocannabinoid composition as provided herein in combination with a small molecule agent that binds to or inhibits the activity of one or more of IL-2, MAPK, IGFR, BRCA, BRCA1, BRCA2, Androgen Receptor (AR), Estrogen Receptor (ER), progesterone Receptor (PR), MSH2, MSH6, ATM, PMS2, STK11, TP53, P53, EGFR, EGFR2, KRAS, Pan-RAS, KIT, TRK, APC, CHK2, RETK, EPCAM, MLH1, RAD51C, RAD51D, NTRK, PARP, PTEN, VEGFR, VEGF, ALK, BRAF, MEK, BTK, PDGFR, HER, HER2, JAK, ERK, and ERBB.

As used herein, "therapeutically effective amount" is intended to include an amount of a substance (or compound) described herein, or an amount of the combination of substances (or compounds) described herein, e.g., to treat or prevent the disease or disorder, or to treat the symptoms of the disease or disorder, in a subject. The combination of substances (or compounds) is preferably a synergistic combination. Synergy, as described for example by Chou and Talalay, Adv. Enzyme Regul., 22:27 (1984), occurs when the effect of the compounds when administered in combination is greater than the additive effect of the compounds when administered alone as a single agent. In general, a synergistic effect is most clearly demonstrated at suboptimal concentrations of the compounds. Synergy can be in terms of lower cytotoxicity, increased activity, or some other beneficial effect of the combination compared with the individual components.

Other therapeutic benefits or beneficial effects provided by the methods described herein may be objective or subjective, transient, temporary, or long-term improvement in the condition or pathology, or a reduction in onset, severity, duration or frequency of an adverse symptom associated with or caused by cell proliferation or a cellular hyperproliferative disorder such as a neoplasia, tumor or cancer, or metastasis. A satisfactory clinical endpoint of a treatment method in accordance with the invention is achieved, for example, when there is an incremental or a partial reduction in severity, duration or frequency of one or more associated pathologies, adverse symptoms or complications, or inhibition or reversal of one or more of the physiological, biochemical or cellular manifestations or characteristics of cell proliferation or a cellular hyperproliferative disorder such as a neoplasia, tumor or cancer, or metastasis. A therapeutic benefit or improvement therefore be a cure, such as destruction of target proliferating cells (e.g., neoplasia, tumor or cancer, or metastasis) or ablation of one or more, most or all pathologies, adverse symptoms or complications associated with or caused by cell proliferation or the cellular hyperproliferative disorder such as a neoplasia, tumor or cancer, or metastasis. However, a therapeutic benefit or improvement need not be a cure or complete destruction of all target proliferating cells (e.g., neoplasia, tumor or cancer, or metastasis) or ablation of all pathologies, adverse symptoms or complications associated with or caused by cell proliferation or the cellular hyperproliferative disorder such as a neoplasia, tumor or cancer, or metastasis. For example, partial destruction of a tumor or cancer cell mass, or a stabilization of the tumor or cancer mass (in terms of size or cell numbers) by inhibiting progression or worsening of the tumor or cancer, can reduce mortality and prolong lifespan even if only for a few days, weeks or months, even though a portion or the bulk of the tumor or cancer mass remains.

In particular embodiments, a composition described herein is useful for improving the immune response following administration of a vaccine. The vaccine may be, for example, a seasonal flu vaccine (influenza), the shingles vaccine used to prevent flare ups caused by the Varicella zoster virus, the pneumococcal vaccines PCV13 (pneumococcal conjugate vaccine 13-valent), PPSV23 (pneumococcal polysaccharide vaccine 23-valent), or a pneumococcal polysaccharide conjugate vaccine used to prevent infections caused by numerous strains of the bacterium *Streptococcus pneumoniae*, a *Salmonella* Vi polysaccharide vaccine, a meningococcal polysaccharide vaccine, *Hemophilus influenzae* polysaccharide vaccine, and Tdap vaccine used to prevent tetanus, diphtheria and pertussis infections. In some embodiments, the composition described herein is particularly useful in boosting an immune response (e.g. to a vaccine) in individuals 50 and older, particularly those 65 and older. In yet other embodiments, a composition is administered to enhance an immune response to a vaccine in a subject that has received a bone marrow transplant.

In certain embodiments, a composition is administered to a subject to treat a bacterial infection where the bacterium may be, but not limited to, *Streptococcus pneumoniae, Tubercle bacilli, Bacillus anthracis, Escherichia coli, Salmonella typhimurium, Salmonella typhi, Salmonella thyphosa, Yersinia pestis, Vibrio cholerae, Clostridium perfringens, staphylococcus, Pseudomonas aeruginosa, Shigella, Klebsiella, Haemophilus influenzae, Pasteurella, Actinobacillus, Legionella, Bordetella pertussis, Francisella tularensis, Brucella, Vibrio parahaemolyticus, Neisseria gonorrhoeae, Neisseria meningitidis, Helicobacter pylori, Spirillum minus, Borrelia recurrentis, Borrelia burgdoferi, Clostridium tetani, Mycobacterium leprae*, and *Mycobacterium lepromatosis*. In other embodiments, a composition is administered to a subject to treat a parasitic infection where the parasite may be, but not limited to, *Plasmodium, Schistosoma, Ascaris, Dracunculus Babesia, Toxoplasma, Eimeria, Isospora, Atoxoplasma, Cystoisospora, Hammondia, Besniotia, Sarcocystis, Frenkelia, Haemoproteus, Leucocytozoon, Theileria, Perkinsus, Nosema, Enterocytozoon, Encephalitozoon, E. intestinalis, Mrazekia, Amblyospora, Arneson, Glugea*, and *Pleistophora*. In yet other embodiments, a composition is administered to a subject to treat a fungal infection where the fungus may be, but not limited to, *Aspergillus, Blastomyces dermatitides, Candida albicans, Coccidioides, Cryptococcus neoformans, Cryptococcus gattii, Histoplasma capsulatum, Mucoromycotina, Pneumocystis jirovecii, Sporothrix schenckii*, and *Exserohilum*.

The terms "compound", "composition", or "substance" as used herein may be used interchangeably to discuss the therapeutic composition.

Also provided are methods for manufacturing a phytocannabinoid composition described herein, in particular a nanoemulsion that includes at least one cannabinoid isolate, four terpene isolates, and an oil, such as olive oil. Accordingly, in certain embodiments, the method includes heating a cannabinoid isolate (e.g. CBD) to a temperature of at least 80 degrees Celsius and mixing the isolate with olive oil NF-grade. The resulting mixture is homogenized via a thermomixer at least 100 rpm and 80 degrees Celsius and added to a solution containing one or more non-ionic surfactant (e.g. polysorbate-80), sterile water USP-grade, and one or more terpene isolates (e.g. limonene, linalool, myrcene, and alpha-pinene), mixing (e.g., vortexing), and the resulting combination is emulsified and/or microsheared for at least (10) cycles via an emulsion chamber to generate water-soluble nanoparticles characterized by a mean particle diameter size up to 900 nm. In certain embodiments, the ingredients are emulsified and/or micro-sheared for at least twenty-five (25) cycles. In other embodiments, as an alternative to or in combination with emulsifying and/or micro-shearing the combination, repeat sonification of the ingredients is performed for at least ten 10 cycles at at least twenty 20 microns per cycle to generate water-soluble nanoparticles up to 900 nm in diameter.

Various embodiments in the specification are presented using "comprising" language, which is inclusive of other components or method steps. When "comprising" is used, it is to be understood that related embodiments include descriptions using the "consisting of" terminology, which excludes other components or method steps, and "consisting essentially of" terminology, which excludes any components or method steps that substantially change the nature of the embodiment or invention.

The terms "a" or "an" refers to one or more, for example, "a ligand" is understood to represent one or more ligands. As such, the terms "a" (or "an"), "one or more," and "at least one" are used interchangeably herein.

The term "about" as used herein can allow for a degree of variability in a value or range, for example, within 10%, within 5%, or within 1% of a stated value or of a stated limit of a range. When a range or a list of sequential values is given, unless otherwise specified any value within the range or any value between the given sequential values is also disclosed. Unless otherwise indicated, all numbers expressing quantities of ingredients, properties such as molecular weight, reaction conditions, and so forth used in the specification and claims are to be understood as being modified in all instances by the term "about."

With regard to the description of the inventions provided herein, it is intended that each of the compositions described, is useful, in another embodiment, in the methods of the invention. In addition, it is also intended that each of the compositions herein described as useful in the methods, is, in another embodiment, itself an embodiment of the invention.

The following examples are provided for the purpose of illustration only and the invention should in no way be construed as being limited to this example but rather should be construed to encompass any and all variations that become evident as a result of the teaching provided herein.

EXAMPLES

Example 1: Materials and Methods

Tumor Models

For the induction of primary tumors, 8- to 14-week-old mice were anesthetized (2-5% Isoflurane under controlled supervision and monitoring) and subcutaneously (s.c.) injected in the shaved right flank with $10^5$-$10^6$ cells suspended in 100 µl of phosphate buffered saline using a 27 G needle. Tumor growth was monitored using Traceable™ Digital Caliper (Fisher Scientific, resolution: 0.01 mm) at least three times each week. Mice bearing tumors are treated via various routes, such as i.p., i.v., oral. sublingual, intra-tumoral and topical. For oral treatment, a gavage is used to deliver SRIN-009 in 100 µl of volume. For i.p. and i.v. (via tail vein) delivery of SRIN-009, 27 G needle is used for injection in 100 µl volume. For sublingual treatment ~5-7 µl is applied under the tongue. For topical application ~25 µl is applied on the tumor implanted area. For intra-tumoral injection 25-50 µl volume is injected using a 31 G insulin syringe.

Species: Mice; C57BL6 for YUMM cell-lines and Nude mice for Xenograft models

Ages: ~8-14 weeks (~25 grams)

Sex: Male for YUMM1.7 and female for YUMM3.3 to match the sex of the respective cell-lines. For xenograft model females are used for A375 to match the sex of this human cell-line.

5-FU Treatment: 5-Fluorouracil (5 FU; Sigma Chemical Co, St Louis, MO) is dissolved in phosphate buffered saline (PBS), pH 7.4, at 6.0 mg/10 ml. PBS alone is used as the vehicle injection. All treatment solutions are sterile filtered and stored at 4° C. for no more than 7 days. 5-FU treatment or PBS in proportion to body weight (60 mg/kg) through intraperitoneal (i.p.) injection once per day for 5 days.

Doxorubicin treatment: Mice receive a total of 25 mg/kg of Doxorubicin (Sigma, St. Louis, MO) five intraperitoneal injections of 5 mg/kg in saline, given at 7-day intervals; control mice receive saline injections).

Immune Responses to Widely Used Model Antigen Systems in Mice a) To measure the T cell-dependent immune responses, mice are immunized with 50 µg of nitrophenyl-conjugated-chicken gammaglobulins (NP-CGGs; Research Technologies) precipitated in alum and injected intraperitoneally. Blood samples obtained on 0, 4, 7, 10, and 14, 21 and 28 days postimmunization are diluted and NP-specific response are determined by ELISA using NP-conjugated BSA (NP-BSA; Research Technologies) (5 µg/ml)-coated microtiter plates.

b) To measure T cell-independent immune responses, 50 µg NP-Ficoll (NP40-aminoethyl carboxymethyl-Ficoll; Biosearch Technologies, Novato, CA) is dissolved in 100 µl Dulbecco's PBS (Mediatech, Herndon, VA) and used to immunize mice i.p. Blood samples are obtained 0, 7, and 14 days following immunization.

Anti-Bacterial Polysaccharide Responses in Mice

Responses to polysaccharides are critical for protection against a number of bacterial pathogens such as *Pneumococcus, Meningococcus* and *Salmonella*. In fact, polysaccharides isolated from these bacteria are the principle immunogens in the current vaccines against these pathogens. Unfortunately, immune responses in chemotherapy patients are impaired; therefore, the protection with these vaccines are limited. Mice are immunized intraperitoneally or intravenously or intradermally with these polysaccharides at a concentration of 2.5 to 50 micrograms in 100 microliters of phosphate-buffered saline (PBS). To measure antibody response, 20 ul of blood is drawn for analysis on days 0, 7, 10, 14, 17, 21, 28, 60, 70, 77, 84, 98 post-immunization. Heightened antibody response to secondary immunization is a reflection of the formation of memory during the primary immunization. Therefore, in some experiments the mice are reimmunized on 60 or 70 days after the primary immunization and blood samples are collected weekly for 4 more weeks. Immunized animals are sacrificed by CO asphyxiation and tissues are collected for further analysis.

Pneumococcal (*Streptococcus pneumoniae*) Model of Infection

*Pneumococcal* vaccine is a mixture of pneumococcal polysaccharides that are currently given to humans via intramuscular injection (500 microliters). The efficacy of this vaccine is measured in mice treated with chemotherapy agents. This is determined by the survival of the mice after infection of immunized mice. Since death is an inevitable end point in this category of studies, we use the moribund state (i.e., as soon as we notice any visible signs of sickness such as hunched back and lack of an active movement and grooming, etc) of the infected mice as the endpoint in our study. Pneumococcal polysaccharide immunized mice as described above are challenged on day 28 post-immunization with 5000 pneumococci (bacteria) in 100 microliters of PBS (intraperitoneal or intravenous injection). At this infection dose it was shown that unimmunized wildtype mice die by 72 hours post-infection (0% survival). However, between 48-60 hours post-infection the majority of mice become moribund, and none recover from this state. Moribund mice are euthanized and disposed accordingly. Mice that survive the infection without any signs of sickness by day 4 post-infection likely will survive indefinitely and therefore are monitored for 10 days post-infection and on day 11 are sacrificed by $CO_2$ inhalation.

*Salmonella enterica Typhimurium* Model of Infection

Responses to the *S. typhi* polysaccharide vaccine that is currently given to humans by intramuscular injection (in 500 microliters) and has been tested to be non-toxic are studied in mice. Heat-killed *S. typhi* is also currently used as a vaccine of choice. The anti-typhoid polysaccharide antibody response is analyzed using both typhoid polysaccharide (Typhim Vi® Sanofi Pasteur) as well as heat-killed *S. typhi*. To measure antibody response, 20 ul of blood is drawn for analysis on days 0, 7, 10, 14, 17, 21, 28, 60, 70, 77, 84, 98 post-immunization. Heightened antibody response to secondary immunization is a reflection of the formation of memory during the primary immunization. Therefore, in some experiments the mice are reimmunized on 60 or 70 days after the primary immunization and blood samples are collected weekly for 4 more weeks. Immunized animals are sacrificed by CO asphyxiation and tissues are collected for further analysis.

Example 2: An Injectable Cannabinoid Nanoemulsion

The bioavailability of medications is a critical factor for achieving high therapeutic efficacy. Cannabinoids, such as cannabidiol, possess a number of anti-neoplastic properties, however, their highly lipophilic nature gives them certain limitations, such as poor water solubility, poor bioavailability, and sub-optimal bioactivity. The FDA-approved non-emulsion cannabidiol-containing drug Epidiolex®, and published work on cannabidiol emulsion formulations were developed for oral administration only. However, the oral route of administration of cannabidiol is not efficient enough to achieve high systemic concentrations of cannabidiol due to first pass metabolism. The first pass effect is a phenomenon whereby the concentration of a drug is greatly reduced before it reaches the systemic circulation due to drug metabolism in the liver. In fact, previous animal studies have shown that the oral bioavailability of cannabidiol is very low, likely due to first pass effect. For achieving high concentrations of an API for effective treatment, route of administration is known to be a critical parameter. For example, Deiana et al. administered 120 mg/kg cannabidiol either orally or i.p. and found that mice that received oral had plasma levels of 2.2 mcg/ml, whereas those received i.p. had plasma levels of 14.3 mcg/ml.

We have developed cannabinoid nanoemulsion drug compositions that are uniquely suited for injectable routes of administration, namely intravenous, intramuscular, subcutaneous, intraperitoneal, intradermal, intratumoral, intralesional and/or intraocular. Increasing the bioavailability and enhancing bioactivity are imperative for cannabidiol's therapeutic success in treating diseases and cancers. Injectable cannabinoid-containing CHLEC nanoemulsion compositions we have developed such as SRIN-009, contain a hydro-lipid emulsion excipient complex which assists the cannabinoid such as cannabidiol in overcoming its natural limitations as described prior, such as poor water solubility, bioactivity, and bioavailability.

All ingredients in the hydro-lipid excipient complex are safely injectable and pharmaceutical-grade. SRIN-009 contains purified isolate cannabidiol that is emulsified with a hydro-lipid excipient complex that enables the final SRIN-009 formulation to be a nanoemulsion drug composition that has high water solubility and significantly better bioactivity as tested pre-clinical cancer models and data is provided in this application.

Figure 1:
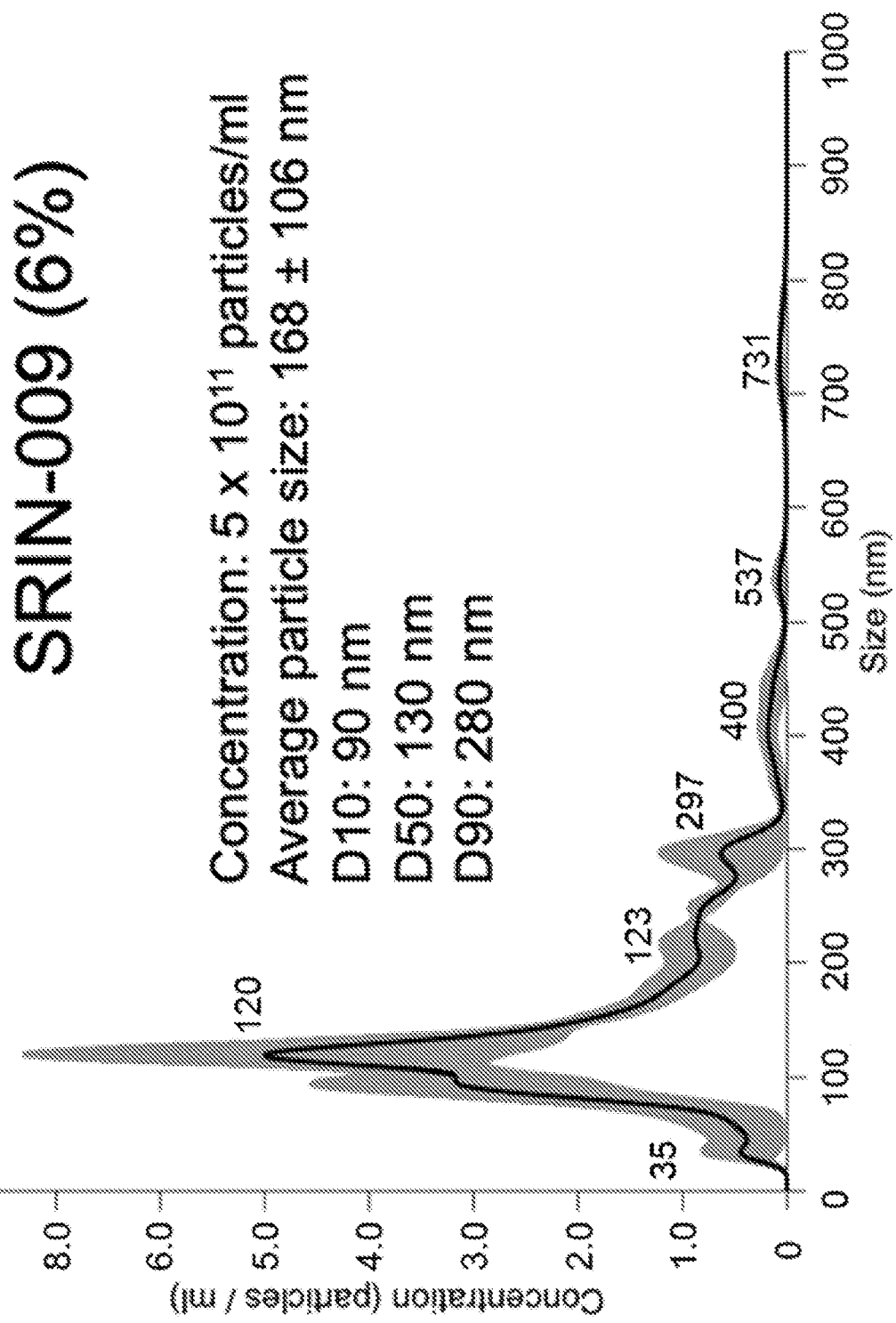
FIG. 1 shows physical characteristics of SRIN-009, a nanoemulsion drug composition containing 6% Cannabidiol (API) and hydro-lipid excipient complex containing: polysorbate-80 (0.1% w/v), olive oil NF (20% w/v), limonene (0.25%), linalool (0.25%), myrcene (0.25% w/v), alpha-Pinene (0.25% w/v), and sterile water USP (72.9% w/v). The particle concentration and size were measured on a NanoSight NS300 equipment. Black line is the mean of three consecutive measurements and the grey area represents the range of the three measurements. The concentration and the size of the nanoparticles are indicated. The most commonly used metrics when describing particle size distributions are D-Values (D10, D50 & D90) which are the intercepts for 10%, 50% and 90% of the cumulative particle sizes.

In cannabidiol-containing SRIN-009, the hydro-lipid excipient complex contains NF-grade olive oil, polysorbate 80, sterile water USP-grade, GRAS limonene, GRAS linalool, GRAS myrcene, and GRAS alpha-pinene. The API-grade isolate cannabinoid (e.g. cannabidiol) is heated to a temperature at least 80 degrees Celsius and slowly injected to olive oil NF-grade. The resultant mixture was vigorously vortexed and homogenized further using a thermomixer at at least 100 rpm and 80 degree Celsius. This procedure confirms a complete and homogeneous solubility of the otherwise highly viscous API, cannabidiol. This mixture while very hot (no less than 65 degree Celsius) is added to another pre-mixed solution containing polysorbate 80, sterile water USP-grade, limonene, linalool, myrcene, alpha-pinene and vortexed vigorously. The entire process is concluded through the resulting solution being further homogenized by mechanical micro-shearing at least twenty-five (25) cycles using an emulsion chamber to generate a final nanoparticle drug composition that is readily soluble in water. The resulting product is a cannabidiol nanoemulsion drug composition, SRIN-009, which has particle size range up to 900 nanometers (FIG. 1).

Example 3: Effects of SRIN-009 Administration on Complete Blood Cell Counts and Immune Responses Since treatment with chemotherapeutic agents result in a number of side effects, including altered blood cell compositions and immune responses, we tested the impact of SRIN-009 treatment by performing a complete cell count of mouse peripheral blood. The CBC analysis was performed on a GENESIS™ Veterinary Hematology System, a quantitative, automated hematology analyzer intended for determining a variety of hematologic parameters. We collected blood into a MicroCollect® tube containing K3EDTA as an anti-coagulant. We found that, unlike chemotherapeutic agents, SRIN-009 treated mice did not show any discernable side effects. For example, the % hematocrit, RBC counts, and percentages or numbers of lymphocytes were not significantly altered compared to untreated groups (FIG. 2).

Figure 3:
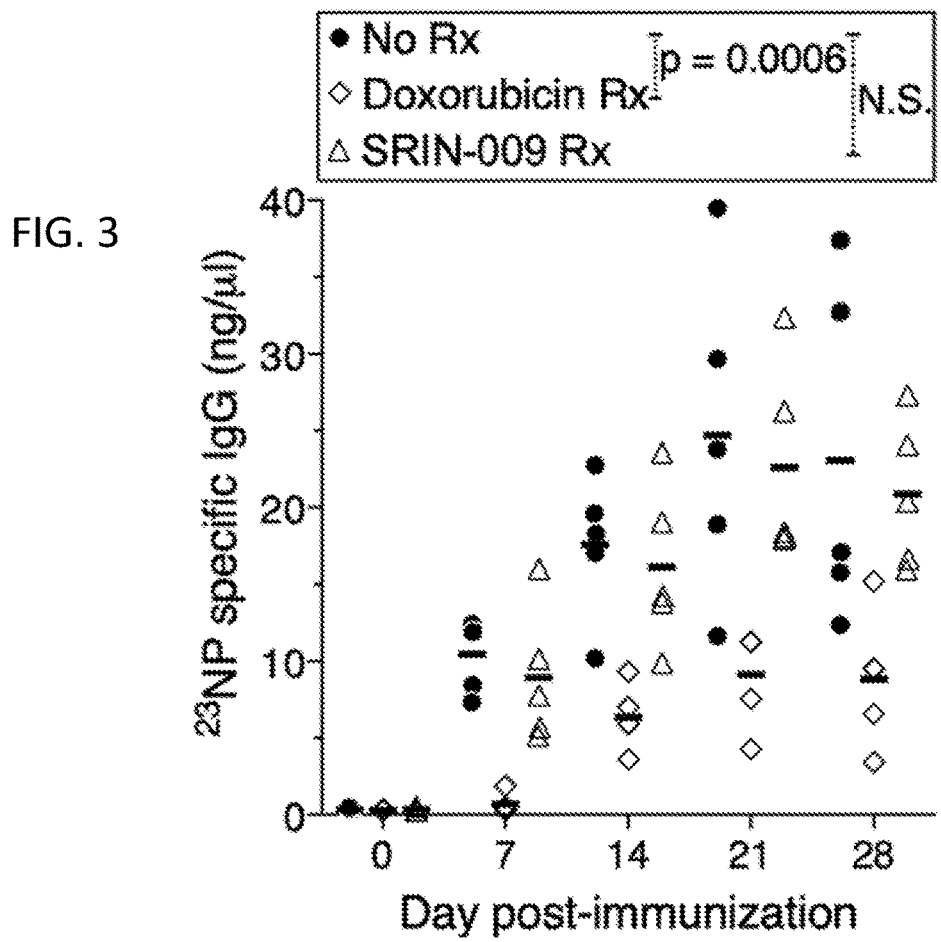
FIG. 3 shows SRIN-009 treatment does not alter antibody responses to immunization. Mice were treated with SRIN-009 2% (as shown in FIG. 5A) or doxorubicin (250 mcg in 200 mcl PBS, i.p. once a week for 3 weeks. Nitrophenyl (NP)-conjugated-chicken gammaglobulin (NP-CGG) is a widely used model antigen to evaluate T cell-dependent B cell responses. To test the functionality of lymphocytes, SRIN-009 treated mice were immunized i.m. with alum-precipitated NP-CGG, and the kinetics of hapten NP-specific IgG responses were measured using $^{23}$NP-BSA as the capture reagent in an ELISA. Statistical differences were determined using two-way ANOVA with Bonferroni post-test. N.S. denotes not significant.
Figure 4:
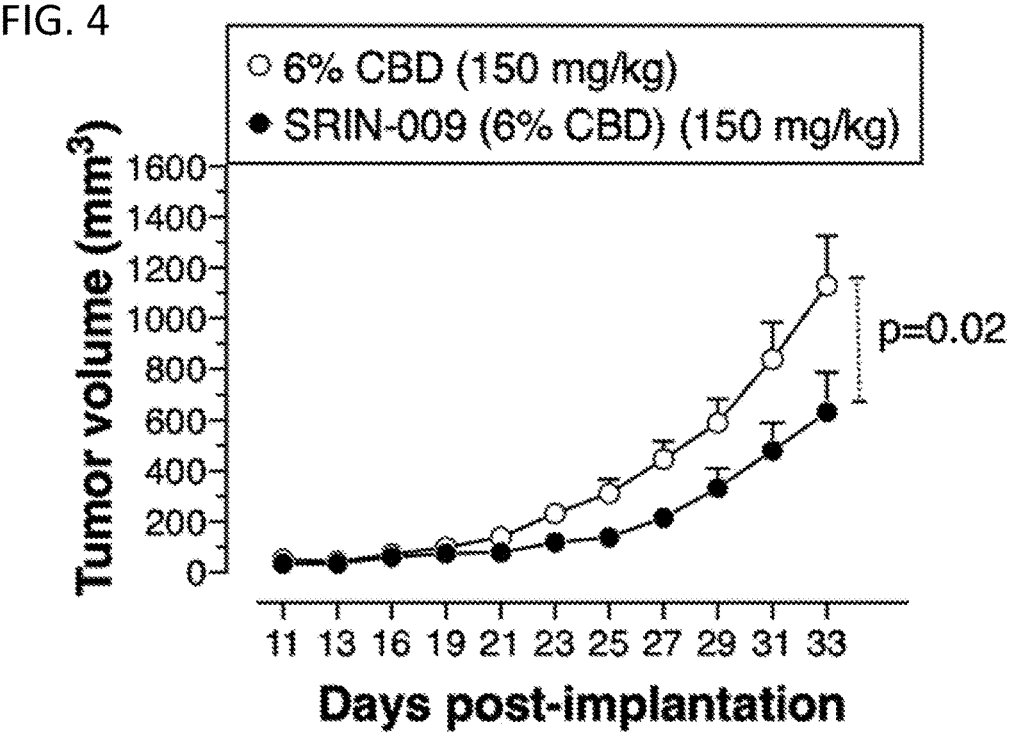
FIG. 4 shows comparative effects of SRIN-009 (6% CBD) and plain CBD (6%) on melanoma progression. Ten-week old C57BL6 male mice were inoculated s.c. with 2×10$^5$ YUMM1.7 cells, and when tumors reached a volume of 75+25 mm$^3$, mice with similarly sized tumors were randomized into two groups and each group was treated with either SRIN-009 containing the hydro-lipid excipient complex (containing 6 mg cannabidiol, the API of in 100 mcl i.p.) or 6% plain CBD (containing 6 mg cannabidiol in 100 mcl i.p.) without the SRIN-009 hydro-lipid excipient complex. Each curve represents mean SEM and differences were determined using two-way ANOVA with Bonferroni post-test.

Antibody responses to the hapten nitrophenyl (NP) when conjugated to chicken gammaglobulin (CGG) as a carrier protein are induced by T cell-dependent B cell-mediated process. Therefore, NP-CGG is widely used as a model system to evaluate both T and B cell responses. To measure the functionality of both B and T cells, mice treated with SRIN-009 6% or with doxorubicin as a chemotherapeutic drug as a control, were immunized intramuscularly with 50 mcg of NP-CGGs (Biosearch Technologies, Petaluma, CA) precipitated in FDA-approved alum as an adjuvant (Thermo Scientific, Rockford, IL). Serum samples were obtained on 0, 7, 14, 21, and 28 days post-immunization and hapten-specific IgG responses were determined by ELISA as described. We found that SRN-009 treatment, unlike doxorubicin, did not affect NP-specific IgG responses (FIG. 3), suggesting that SRIN-009 treatment does not interfere with functional immune responses and is compatible with cancer immunotherapeutic approaches.

Example 4: Treatment of Melanoma

Chemotherapy drugs such as dacarbazine have been the mainstay of metastatic melanoma therapy for over three decades, although efficacy in terms of survival has never been proven in a randomized clinical trial [41, 42]. Melanoma is considered to be an immunogenic tumor on the basis of spontaneously occurring melanoma regressions and some durable tumor responses observed after treatment with a variety of immunostimulating agents [43, 44]. Consistent with this, FDA-approved immune checkpoint inhibitors targeting PD-1 (nivolumab and pembrolizumab) and CTLA-4 (ipilimumab) have dramatically improved clinical outcome, but still only induce responses in ~50% of melanoma patients [45-47]. Since mainstream chemotherapy agents adversely impact the cell count and/or proper function of the immune system, their synergy with immunotherapy may not always be very efficient [34]. Therefore, incorporation of novel adjunct therapeutics that are compatible with functional immune responses is an appealing strategy for improving the treatment of melanoma.

Previously, the therapeutic effect of cannabidiol in combination with 49-tetrahydrocannabinol (THC), but not cannabidiol alone, was tested using A375 (human) melanoma xenograft in immunodeficient mice [25]. Accordingly, the actual effect of cannabidiol as the API was not assessed. Recently, a pilot study was conducted to test the effect of cannabidiol using B16F10 melanoma and data were presented at one timepoint and the reasons were not apparent [17]. Although cannabidiol is not soluble in water, in this study it was dissolved in saline solution, making it difficult to assess the actual therapeutic effect of cannabidiol due to bioavailability [17]. Furthermore, while B16 has been very useful for the study of melanoma tumor biology, it is a relatively unique tumor cell line with no obvious analogs, making validation and confirmation experiments more difficult to plan and execute [48]. Additionally, the genetic drivers of B16 have not been well defined, making it difficult to translate to genotype-specific melanoma subsets. Thus, there has been a need for more rigorous studies, involving novel formulations that increase cannabidiol's bioavailability and enhance its bioactivity in genetically well-defined human-relevant melanoma models.

The Yale University Mouse Melanoma (YUMM) lines, a comprehensive system of mouse melanoma cell lines that are syngeneic to C57BL/6, have well-defined human-relevant driver mutations, and are genomically stable, and thus provide useful preclinical melanoma models [48, 49]. To test whether SRIN-009 has a therapeutic effect in controlling melanoma we have studied YUMM1.7 (CRL-3362, Lot: 70016795, purchased from American Type Culture Collection (ATCC), Manassas, VA), a well-defined genetically engineered mouse cell-line containing the BRAF$^{V600E}$ mutation, as in found in human melanomas. Since this cell-line was derived from male C57BL6 mouse, we have used male C57BL6 mice (stock no. 000664, purchased from the Jackson Laboratories, Bar Harbor, ME) as recipients in the YUMM1.7 tumor model. For tumor inoculation, YUMM1.7 cells were harvested at approximately 60-85% confluence on the day of injection. Cells were trypsinized with 0.25% trypsin for approximately 2-3 minutes before deactivation with media containing 10% serum. They were then washed twice with sterile phosphate buffered saline and counted with a hemocytometer. For the induction of primary tumors, 10 week-old mice were anesthetized and subcutaneously (s.c.) injected in the shaved right flank with $2.5 \times 10^5$ YUMM1.7 cells suspended in 100 mcl of phosphate buffered saline using a 27 G needle. Tumor growth was monitored using Traceable™ Digital Caliper (Fisher Scientific, resolution: 0.01 mm) at least three times each week and tumor volume was calculated using the following equation:

$0.52 \times length \times width^2$. When the tumor volume reached $75\pm25$ mm$^3$, various treatments were started. Treatments were either with dacarbazine or SRIN-009 containing cannabidiol 20 mg/ml (i.e. 2%), 60 mg/ml (i.e. 6%) or 60 mg/ml plain cannabidiol emulsion without the SRIN-009 hydrolipid excipient complex. To test potential synergy, a group of mice were treated with both dacarbazine and SRIN-009 6% (FIG. 5A). When the tumor volume reached $1200\pm300$ mm$^3$, mice were euthanized, and the day of euthanasia was considered as the endpoint of survival.

We found that compared to untreated mice, the kinetics of YUMM1.7 tumor growth was reduced upon SRIN-009 treatment in a dose-dependent manner (FIG. 5B). Since we started to lose mice by 23 days post-implantation due to the euthanasia criterion described above, statistical analyses (two way-ANOVA) for all the five groups was performed up until day 23 (FIG. 5C). The results indicate that the therapeutic effect of SRIN-009 exceeded that of dacarbazine. Although there was not an obvious synergistic effect of SRIN-009 6% with dacarbazine at concentration (i.e. 6%) tested, it did not alter the efficacy of this chemotherapeutic agent, suggesting that SRIN-009 is compatible with current chemotherapeutic approaches for melanoma. SRIN-009 treatment significantly increased survival of tumor-bearing mice compared to untreated mice (FIG. 5B). The prolonged survival was directly proportional to the dose of cannabidiol.

Example 5: Dose-Escalation Studies in Mouse and Human Melanoma Models

As described above, the YUMM1.7 models are useful for demonstrating SRIN-009 therapeutic efficacy, in particular because these cells have well-defined mutations, including the human relevant BRAF$^{V600E}$ mutation, and are responsive to current treatment regimens such as BRAF and MEK inhibitors. In a syngeneic, sex-matched C57BL6 model, potential immune responses of the host toward YUMM cells is expected to be minimal. In fact, YUMM1.7 is not a very immunogenic tumor. Therefore, even a marginal decrease in tumor burden can be attributed to the therapeutic efficacy of SRIN-009 (as shown in FIG. 1).

Since cancers are known to be heterogeneous it is important to rigorously test the efficacy of cannabinoid formulations using other models. Sometimes an extreme variability can be observed with the same treatment/dose/route in different tumor lines. Accordingly, the efficacy of SRIN-009 is also evaluated in a YUMM3.3 melanoma model. YUMM3.3 (also BRAF mutant) is a well characterized cell line and is derived from female mouse and has wildtype Pten alleles unlike YUMM1.7. Therefore, the effect of sex as well as other background mutations on SRIN-009 therapeutic effect can be tested. While work with murine cell-lines elegantly capture a number of human diseases, it is important to extend the proof of concept with actual human melanoma cells. To address this, studies are conducted using A375 and WM793, BRAF mutant human cell lines (available from ATCC) to test the therapeutic efficacy of SRIN-009 in xenograft models.

The in vivo model for YUMM1.7 and YUMM3.3 melanoma is established as shown in the FIG. 2 and described in Example 4. The xenograft models for A375 melanoma and WM793 are established as follows: The human melanoma cell line A375 (CRL-1619) will be purchased from ATCC. For the A375 model, 8-10-week-old male nude mice (purchased from Charles River, stock: 088) will be used. When the mean tumor volume reaches $75\pm25$ mm$^3$ as shown in FIG. 5A., mice are randomly allocated to groups of ten which are designated as either the treatment or control group. Since i.p. administration of SRIN-009 controls the tumor burden in the YUMM1.7 model, groups of mice (n=8) i.p. daily with increasing concentrations of cannabidiol (20, 40, 60, 80, 100 and 120 mg/ml) in SRIN-009 nanoemulsion formulations. A control group of mice are treated with the same composition without cannabidiol (vehicle treatment). Immune responses are also evaluated as in Example 4 to ensure that increasing concentrations such as 80-120 mg/ml groups do not adversely affect the immune system.

Since SRIN-009 at 20 and 60 mg/ml of cannabidiol as API in a nanosomal formula exerts a dose-dependent anti-tumoral activity against YUMM1.7 tumors, it is expect that in the YUMM1.7 and YUMM3.3 models, higher concentrations of cannabidiol will decrease tumor burden more dramatically and prolong the survival. Since cannabidiol seems to synergize with THC on A375 melanoma, and SRIN-009 inhibits YUMM1.7 tumor growth (FIG. 5A-FIG. 5C), it is expected that our cannabidiol nanoemulsion formulations (SRIN-009) will control human melanoma as well. A moderate control of A375 tumors would also suggest that SRIN-009 exerts anti-tumoral effect independent of T cells. Such findings will prompt further studies in the future to evaluate SRIN-009's effect on the immune system and immunotherapy. Confirmatory studies using other commercially available human melanoma cell-lines such as WM793 (CRL-2806) and 1205lu (CRL-2812) are carried out in xenograft models to support the data obtained from the A375 model.

Example 6: Evaluation of Various Routes of Administration of SRIN-009 Formulations The bioavailability of medications is a critical factor for achieving therapeutic efficacy. This aspect for cannabidiol was determined using several routes of administration [4]. The first pass effect is a phenomenon whereby the concentration of a drug is greatly reduced before it reaches the systemic circulation due to drug metabolism in the liver [50, 51]. Notable drugs that experience a significant first-pass effect include cannabis. In fact, previous animal studies have shown that the oral bioavailability of cannabidiol is very low [2, 3]. To achieve high levels of API for an effective treatment, route of administration is an important parameter. For example, Deiana et al. administered 120 mg/kg cannabidiol either orally or intraperitoneally and measured peak plasma levels. In these previous studies, mice that received oral cannabidiol had plasma levels of 2.2 µg/ml whereas those that received i.p. injections resulted in peak plasma levels of 14.3 µg/ml [35]. Sublingual administration can be advantageous over oral administration as it is more direct, rapid, and ensures that the substance will not risk first pass effect by liver before entering the bloodstream. We have developed various compositions of SRIN-009, that are uniquely suited for routes of administrations such as i.v., as well as intratumoral, oral, sublingual, and topical.

Since we have demonstrated efficacy in the YUMM1.7 melanoma model (Example 4), the YUMM1.7 melanoma model is used to test such concentrations (e.g. "x" mg/kg body weight) in i) an oral route of administration using gavage technique, sub-lingual administration, and topical application by applying on the melanoma cell implanted area. Intra-tumoral, intravenous, and i.p. administration are performed as described in Example 4 and FIG. 5A-FIG. 5C. For i.p., i.v., and oral administration 100 µl volume with the same concentration of cannabidiol is used. Thus, the impact of the route administration is directly comparable. Previous studies on sublingual vaccine administration determined that the total volume has to be kept to <7 µl to avoid swallowing. Accordingly, a 10× higher concentration formulas is administered compared to oral and i.v. or i.p. administrations to compensate for the volume. Topical administrations do permit the use of high volumes. Therefore, a higher concentration of cannabidiol is used as in the case of sub-lingual route of administration. One advantage in these routes of administration is that a remarkably high local concentration of cannabidiol can be achieved. If anti-tumor activity of cannabidiol is directly on the cancer cells we may see high efficacy in this route of administration. If so, intratumoral injection is expected to be very efficient. If it affects the immune system, then injection directly into the tumor would alter the tumor microenvironment, making it more of an anti-tumor environment. Since we measure the tumor volume as a readout, low volumes of high concentrations of our formulations. Accordingly, we use same volume of vehicle without cannabidiol to make our volume measurements comparable. Confirmatory studies are extended using other mouse, e.g. YUMM3.3 and human A375 melanoma models as described in Example 5. Studies of the immune system and responses as described above in Example 1 (FIG. 2 and FIG. 3) will be performed to ensure that routes of administration to increase cannabidiol's bioavailability do not alter the immune system.

Example 7: Evaluation of SRIN-009 Synergy with BRAF and MEK Inhibitors, such as Vemurafenib and Trametinib Despite BRAF and MEK inhibitors being FDA-approved for stage III and IV metastatic BRAF mutant melanoma patients and displaying robust anti-tumor efficacy, most patients develop resistance or relapse within a year of treatment [52]. Thus, strategies to improve the efficacy of BRAF and MEK inhibitors are crucial. BRAF and MEK inhibitors rely on a functional immune system [53-58], thus combinatorial strategies that do not alter the immune system must be employed. MEK inhibition limits the formation of anti-tumor immune responses; however, boosting those limited responses drastically improves MEK inhibitor efficacy [59, 60]. As SRIN-009 is more efficacious than dacarbazine at the concentrations tested (FIG. 5A-FIG. 5C), displays limited immune related side effects (FIG. 2 and FIG. 3), and cannabidiol boosts immune-mediated killing of cancer cells, it is likely that SRIN-009 will offer a robust combinatorial effect with BRAF and MEK inhibitors by rescuing the immune inhibition of MEK inhibition.

Using the concentrations and route of administrations SRIN-009 determined according to studies described, for example, in Examples 4 and 5, the combinatorial effects of SRIN-009 with the clinically approved BRAF (vemurafenib) and MEK (trametenib) inhibitor will be determined. YUMM1.7 tumors are formed in C57BL6 mice as described in Example 4 above, at which point mice with similar tumors sizes are divided into four groups: 1) vehicle treatment, 2) SRIN-009 treatment, 3) BRAF and MEK inhibitor treatment, and 4) SRIN-009 plus BRAF and MEK inhibitor treatment. Vemurafenib and trametinib (purchased from Cayman Chemical, Ann Arbor, MI) is administered daily (5× a week) by oral gavage at 100 mg/kg or 0.75 mg/kg. Tumor growth is tracked as described in Example 4 (see also FIG. 5-FIG. 5C). Effects of the combination treatments on tumor growth are also evaluated in the YUMM3.3 and human A375 melanoma models.

It is expected that SRIN-009 will improve the efficacy of BRAF and MEK inhibitors by rescuing the anti-tumor immune efficacy. Since it is likely that the cytokine production of immune cells is unaltered by these treatments, we can test the ability of T cells and NK cells to kill target tumor cells or proliferate in the presence of the drug combinations described above. SRIN-009 improvement of BRAF and MEK inhibitor efficacy indicates that SRIN-009 also has the ability to improve the efficacy of immune checkpoint inhibitors; thus, combinations of SRIN-009 with anti-PD-1, anti-CTLA-4, are evaluated using the YUMM1.7 or immunogenic YUMMER 1.7 model system.

Example 8: Treatment of Lung Cancer

Cannabidiol causes a profound inhibition of human lung cancer cell (A549) invasion and metastasis, due to decreased expression of plasminogen activator inhibitor-1 (PAI-1) and the upregulation of tissue inhibitor of matrix metalloproteinases-1 (TIMP-1) [15, 16]. Previously, it was shown that cannabidiol upregulates ICAM-1 expression on human lung cancer cells (A549) in vitro and this was suggested to promote the efficiency of LFA-1-mediated interaction and killing by lymphokine-activated killer (LAK) cells in vitro [12]. Since the LAK cells used in this study were obtained from healthy donors and are HLA-mismatched to A549 cells, instead of HLA-matched cancer cells or non-cancer cells, it was unclear whether this observation is immunologically relevant or specific to cancer cells. Furthermore, the same research group also tested the effect of cannabidiol in vivo using human A549 cells in a xenograft mouse model. Since the xenograft model is a T cell-deficient system, any potential T cell-mediated effect of cannabidiol was not evaluated. Although cannabidiol is not soluble in water, in the in vitro and in vivo A549 models it was dissolved in saline solution, therefore the availability and the bioactivity of cannabidiol in this type of solution was likely suboptimal. Studies involving immunocompetent syngeneic transplantable mouse models that are relevant for translational purposes can help evaluate the impact of cannabidiol on immunotherapeutic approaches against lung cancer.

Evaluation of novel therapies for lung cancer requires reproducible preclinical models that accurately mimic lung cancer progression, invasion, and metastasis. Syngeneic mouse models permit the transplantation of immunologically compatible mouse cancer cells into immunocompetent mice and allow for characterization of immunologically relevant therapies, including immune checkpoint blockades. A reproducible syngeneic model for lung cancer is the Lewis lung carcinoma (LLC) model. In fact, the LLC was a successful preclinical model for chemotherapeutic drug vinorelbine in vivo, prior to its implementation in clinical trials. The LLC1 cell line (also referred as LL/2) is available commercially (CRL-1642, Lot:70012223, American Type Culture Collection (ATCC), Manassas, VA). Since this cell-line was derived from male C57BL6 mouse, we used male C57BL6 mice (stock no. 000664, purchased from the Jackson Laboratories, Bar Harbor, ME) as recipients in the LLC tumor model. For the induction of primary tumors, 10 week-old mice were anesthetized and subcutaneously (s.c.) injected in the shaved right flank with $5.0 \times 10^5$ LL/2 cells suspended in 100 mcl of Hank's Balanced Salt Solution (HBSS) using a 27 G needle as described previously. Tumor growth was monitored using Traceable™ Digital Caliper (Fisher Scientific, resolution: 0.01 mm) at least three times each week and tumor volume was calculated using the following equation: $0.52 \times length \times width^2$. When the tumor volume reached $75 \pm 25$ mm$^3$, various treatments were started as depicted in FIG. 6A. Treatments were either with carboplatin or SRIN-009 containing cannabidiol 60 mg/ml (i.e. 6%). To evaluate synergy, a group of mice were treated with both carboplatin and SRIN-009 6%. When the tumor volume reached $1200 \pm 300$ mm$^3$, mice were euthanized, and the day of euthanasia was considered as the endpoint of survival.

Compared to untreated mice, the kinetics of LL/2 tumor growth were reduced upon SRIN-009 treatment (FIG. 6C). Since we started to lose mice by 16 days post-implantation due to the euthanasia criterion, statistical analyses (two way-ANOVA) for all the four groups was performed until day 16 (FIG. 6C). The therapeutic effect of SRIN-009 exceeded that of carboplatin. Moreover, we observed a synergistic effect of SRIN-009 with carboplatin suggesting that SRIN-009 is compatible with current platinum-based chemotherapeutic approaches for lung cancer. We also found that SRIN-009 treatment significantly increased survival of tumor-bearing mice compared to untreated mice (FIG. 6B).

Example 9: Treatment of Colon Cancer

Cannabidiol exerts a significant anti-proliferative effect in two colorectal carcinoma cell lines (Caco-2 and HCT116). A mouse model of colon cancer induced by a carcinogen, azoxymethane was used. Therefore, it is not clear whether this model represents a pre-clinical model. Moreover, the solubility of cannabidiol was not defined. GPR55 is implicated in the migratory behavior of colon cancer cells and plays an important role in the prevention of metastasis. Cannabidiol is an antagonist of GPR55, therefore the effect of cannabidiol was tested in a mouse model, where HCT116, a human colon cancer cell line was used. Since the mice used in this study are immunocompetent and the cancer cell is of human origin, the impact of tissue mismatch on the results are difficult to access. Moreover, the cannabidiol was dissolved in dimethyl sulphoxide (DMSO), which is a highly toxic for in vivo experimental purposes. Another study has demonstrated that cannabidiol induces apoptosis in HCT116 and DLD-1 colorectal cancer cell cultures. In this study, the in vivo effect of cannabidiol was tested with HCT116 human cells in immunodeficient mouse model, therefore the impact of the cannabidiol on the immune surveillance of tumor is difficult to interpret. Moreover, the administered cannabidiol was dissolved in ethanol. A recent study investigated the effect of cannabidiol on the CT26 colon cancer line in a mouse model, and cannabidiol was shown to significantly reduce VEGFR expression at doses of 1-5 mg/kg.

CT26 is an N-nitroso-N-methylurethane-induce BALB/c (H-2d) undifferentiated colon carcinoma extensively used as a preclinical model. CT26 was cloned to generate CT26. WT to stably transduce CT26. WT with the gene for lacZ, therefore is a very immunogenic tumor model to understand a variety of immune-related aspects of colon cancer treatments. In fact, using in vivo protection and treatment studies were done to confirm this [61, 62]. The CT26. WT cell line (Mouse colon carcinoma) was obtained from American Type Culture Collection (ATCC) (CRL-2638, Lot:70016788). Since this cell-line was derived from female BALB/c mouse, we have used female BALB/c mice (stock no. 000651, purchased from the Jackson Laboratories, Bar Harbor, ME) as recipients in the CT26 tumor model. For the induction of primary tumors, 10 week-old mice were anesthetized and subcutaneously (s.c.) injected in the shaved right flank with $2.5 \times 10^5$ cells suspended in 50 mcl of Hank's Balanced Salt Solution (HBSS) suspended in 50 mcl of Matrigel (Corning, NY) using a 27 G needle. Tumor growth was monitored using Traceable™ Digital Caliper (Fisher Scientific, resolution: 0.01 mm) at least 3 times each week and tumor volume was calculated using the following equation: $0.52 \times \text{length} \times \text{width}^2$. When the tumor volume reached $75 \pm 25$ mm$^3$, treatments were started as depicted in FIG. 7A. Treatments were done with SRIN-009 containing cannabidiol 60 mg/ml (i.e. 6%). When the tumor volume reached $1200 \pm 300$ mm$^3$, mice were euthanized, and the day of euthanasia was considered as the endpoint of survival.

We found that compared to untreated mice, the kinetics of CT.26 tumor growth was reduced following SRIN-009 treatment (FIG. 7B). Since we started to lose mice by 20 days post-implantation due to the euthanasia criterion, statistical analyses (two way-ANOVA) for all the four groups were performed until day 20 (FIG. 7B). We found that SRIN-009 treatment significantly increased survival of tumor-bearing mice compared to untreated mice (FIG. 7C).

Example 10: Restoration of the Immune System During or Following Chemotherapy

Chemotherapy results in impairment of various arms of the immune system and can dampen pre-existing immune memory generated by prior vaccination. Therefore, chemotherapy patients are more readily susceptible to a variety of infections than normal individuals. Studies are performed to demonstrate the ability of the phytocannabinoid-containing compositions to improve the immune systems of patients that are undergoing or underwent chemotherapy.

Experimental Design

Mice are administered well-known chemotherapy drugs, doxorubicin or 5-fluorouracil. A subset of these mice is also administered the phytocannabinoid composition orally. This will be the standard procedure that is applied to measure a number of endpoints, which are dependent on additional variables described below.

Mice are euthanized and to perform a comprehensive flow cytometric analysis of various cell types (absolute numbers and their frequency) that are present in their bone marrow, thymus, secondary lymphoid organs, spleen and coelomic cavity. Specifically, using a multi-color flow cytometry, pro B, pre B, immature B, transitional B, follicular B and marginal zone B, B1a, B1b, monocytes, macrophages, neutrophils, dendritic cells, Natural Killer (NK), NKT, CD4+T, CD8+T, and plasma cell populations are analyzed. Antibody isotypes and cytokines are measured by ELISA. B cell responses are evaluated by stimulating them with Toll-like receptor and B cell receptor agonists. The relative expression of activation markers such as CD86 and MHC-II are be quantified. Similarly, T cell responses are determined by anti-CD3 and anti-CD28 stimulation. The proper function of granulocytes are evaluated by the measuring the relative levels of reactive oxygen species (ROS) by a fluorometric assay. Analysis are performed using established in vitro assays that are well known in the art.

Further, mice are immunized model T cell-independent and T cell-dependent antigens, NP-Ficoll and NP-Chicken gamma globulins (NP-CGG), respectively. The kinetics, magnitude, and affinity maturation of antigen-specific antibody responses are measured by ELISA and ELISPOT according to widely available protocols.

Example 11: Improving Vaccine Responses During Chemotherapy

Mice are treated with well-known chemotherapy drugs, such as doxorubicin or 5-fluorouracil. A subset of these mice is also administered the phytocannabinoid-containing compositions. This will be the standard procedure that is applied to measure a number of endpoints, which are dependent on additional variables described below.

Groups of mice are immunized with various vaccines such as Typhim Vi, Pneumovax 23, or Prevnar13. These vaccines are currently approved for human use. In addition, some mice are immunized with heat-killed bacteria, a procedure known to induce robust immunological memory and long-lasting immunity. Antibody responses to specific components of these vaccines are determined by ELISA, and the functional quality of those antibodies are evaluated using in vitro based assays such as antibody-dependent bactericidal assay and opsonophagocytic assay. The efficacy of these vaccines are determined by challenging the mice with the corresponding bacterial infection systems, i.e. *Salmonella* or *Pneumococcus*.

Tested parameters at endpoints include: a) total and specific antibody levels, b) in a *Salmonella Typhimurium* infection model, mice are expected to not be moribund by days 3 post-infection and c) lethality in the *Pneumococcal* infection model. Bacterial counts in blood, liver and spleen will be determined by plating the tissue homogenates.

The above indicated endpoint parameters (a, b & c) in mice administered a phytocannabinoid composition such as SRIN-009 are expected to be significantly improved compared to those that do not receive a phytocannabinoid composition.

REFERENCES

1. Hanus, L. O., *Discovery and isolation of anandamide and other endocannabinoids*. Chem Biodivers, 2007. 4(8): p. 1828-41.
2. Iffland, K. and F. Grotenhermen, *An Update on Safety and Side Effects of Cannabidiol: A Review of Clinical Data and Relevant Animal Studies*. Cannabis Cannabinoid Res, 2017. 2(1): p. 139-154.
3. Mechoulam, R., L. A. Parker, and R. Gallily, *Cannabidiol: an overview of some pharmacological aspects*. J Clin Pharmacol, 2002. 42(S1): p. 11S-19S.
4. Millar, S. A., et al., *A Systematic Review on the Pharmacokinetics of Cannabidiol in Humans*. Front Pharmacol, 2018. 9: p. 1365.
5. Pisanti, S., et al., *Cannabidiol: State of the art and new challenges for therapeutic applications*. Pharmacol Ther, 2017. 175: p. 133-150.
6. Yang, Y. T. and J. P. Szaflarski, *The US Food and Drug Administration's Authorization of the First Cannabis-Derived Pharmaceutical: Are We Out of the Haze?* JAMA Neurol, 2019. 76(2): p. 135-136.
7. Campos, A. C., et al., *Cannabidiol, neuroprotection and neuropsychiatric disorders*. Pharmacol Res, 2016. 112: p. 119-127.
8. Maida, V. and P. J. Daeninck, *A user's guide to cannabinoid therapies in oncology*. Curr Oncol, 2016. 23(6): p. 398-406.
9. Abrams, D. *Using Medical Cannabis in an Oncology Practice*. Oncology (Williston Park), 2016. 30(5): p. 397-404.
10. Abrams, D I., *Integrating cannabis into clinical cancer care*. Curr Oncol, 2016. 23(2): p. S8-S14.
11. Sule-Suso, J., et al., *Striking lung cancer response to self-administration of cannabidiol: A case report and literature review*. SAGE Open Med Case Rep, 2019. 7: p. 2050313X19832160.

12. Haustein, M., et al., *Cannabinoids increase lung cancer cell lysis by lymphokine-activated killer cells via upregulation of ICAM-1.* Biochem Pharmacol, 2014. 92(2): p. 312-25.
13. Ramer, R., et al., *Cannabidiol inhibits lung cancer cell invasion and metastasis via intercellular adhesion molecule-1.* FASEB J, 2012. 26(4): p. 1535-48.
14. Ramer, R., et al., *COX-2 and PPAR-gamma confer cannabidiol-induced apoptosis of human lung cancer cells.* Mol Cancer Ther, 2013. 12(1): p. 69-82.
15. Ramer, R., et al., *Cannabidiol inhibits cancer cell invasion via upregulation of tissue inhibitor of matrix metalloproteinases-1.* Biochem Pharmacol, 2010. 79(7): p. 955-66.
16. Ramer, R., et al., *Decrease of plasminogen activator inhibitor-1 may contribute to the anti-invasive action of cannabidiol on human lung cancer cells.* Pharm Res, 2010. 27(10): p. 2162-74.
17. Simmerman, E., et al., *Cannabinoids as a Potential New and Novel Treatment for Melanoma: A Pilot Study in a Murine Model.* J Surg Res, 2019. 235: p. 210-215.
18. McAllister, S. D., et al., *Cannabidiol as a novel inhibitor of Id-1 gene expression in aggressive breast cancer cells.* Mol Cancer Ther, 2007. 6(11): p. 2921-7.
19. Shrivastava, A., et al., *Cannabidiol induces programmed cell death in breast cancer cells by coordinating the cross-talk between apoptosis and autophagy.* Mol Cancer Ther, 2011. 10(7): p. 1161-72.
20. Massi, P., et al., *The non-psychoactive cannabidiol triggers caspase activation and oxidative stress in human glioma cells.* Cell Mol Life Sci, 2006. 63(17): p. 2057-66.
21. Massi, P., et al., *Antitumor effects of cannabidiol, a nonpsychoactive cannabinoid, on human glioma cell lines.* J Pharmacol Exp Ther, 2004. 308(3): p. 838-45.
22. Massi, P., A. Vaccani, and D. Parolaro, *Cannabinoids, immune system and cytokine network.* Curr Pharm Des, 2006. 12(24): p. 3135-46.
23. Solinas, M., et al., *Cannabidiol inhibits angiogenesis by multiple mechanisms.* Br J Pharmacol, 2012. 167(6): p. 1218-31.
24. Vaccani, A., et al., *Cannabidiol inhibits human glioma cell migration through a cannabinoid receptor-independent mechanism.* Br J Pharmacol, 2005. 144(8): p. 1032-6.
25. Armstrong, J. L., et al., *Exploiting cannabinoid-induced cytotoxic autophagy to drive melanoma cell death.* J Invest Dermatol, 2015. 135(6): p. 1629-1637.
26. Rock, E. M. and L. A. Parker, *Cannabinoids As Potential Treatment for Chemotherapy-Induced Nausea and Vomiting.* Front Pharmacol, 2016. 7: p. 221.
27. Ward, S. J., et al., *Cannabidiol inhibits paclitaxel-induced neuropathic pain through 5-HT(1A) receptors without diminishing nervous system function or chemotherapy efficacy.* Br J Pharmacol, 2014. 171(3): p. 636-45.
28. Basu, S. and B. N. Dittel, *Unraveling the complexities of cannabinoid receptor 2 (CB2) immune regulation in health and disease.* Immunol Res, 2011. 51(1): p. 26-38.
29. Basu, S., A. Ray, and B. N. Dittel, *Cannabinoid receptor 2 is critical for the homing and retention of marginal zone B lineage cells and for efficient T-independent immune responses.* J Immunol, 2011. 187(11): p. 5720-32.
30. Basu, S., A. Ray, and B. N. Dittel, *Cannabinoid Receptor 2 (CB2) Plays a Role in the Generation of Germinal Center and Memory B Cells, but Not in the Production of Antigen-Specific IgG and IgM, in Response to T-dependent Antigens.* PLoS One, 2013. 8(6): p. e67587.
31. Schatz, A. R., et al., *Cannabinoid receptors CB1 and CB2: a characterization of expression and adenylate cyclase modulation within the immune system.* Toxicol Appl Pharmacol, 1997. 142(2): p. 278-87.
32. Muppidi, J. R., et al., *Cannabinoid receptor 2 positions and retains marginal zone B cells within the splenic marginal zone.* J Exp Med, 2011. 208(10): p. 1941-8.
33. Simkins, T. J., et al., *Reduced Noradrenergic Signaling in the Spleen Capsule in the Absence of CB1 and CB2 Cannabinoid Receptors.* J Neuroimmune Pharmacol, 2016. 11(4): p. 669-679.
34. Molyneux, G., et al., *Haemotoxicity of busulphan, doxorubicin, cisplatin and cyclophosphamide in the female BALB/c mouse using a brief regimen of drug administration.* Cell Biol Toxicol, 2011. 27(1): p. 13-40.
35. Deiana, S., et al., *Plasma and brain pharmacokinetic profile of cannabidiol (CBD), cannabidivarine (CBDV), Delta(9)-tetrahydrocannabivarin (THCV) and cannabigerol (CBG) in rats and mice following oral and intraperitoneal administration and CBD action on obsessive-compulsive behaviour.* Psychopharmacology (Berl), 2012. 219(3): p. 859-73.
36. Laprairie, R. B., et al., *Cannabidiol is a negative allosteric modulator of the cannabinoid CB1 receptor.* Br J Pharmacol, 2015. 172(20): p. 4790-805.
37. Thomas, A., et al., *Cannabidiol displays unexpectedly high potency as an antagonist of CB1 and CB2 receptor agonists in vitro.* Br J Pharmacol, 2007. 150(5): p. 613-23.
38. Hu, G., G. Ren, and Y. Shi, *The putative cannabinoid receptor GPR55 promotes cancer cell proliferation.* Oncogene, 2011. 30(2): p. 139-41.
39. Elbaz, M., et al., *TRPV2 is a novel biomarker and therapeutic target in triple negative breast cancer.* Oncotarget, 2018. 9(71): p. 33459-33470.
40. Russo, E. B., *Taming THC: potential cannabis synergy and phytocannabinoid-terpenoid entourage effects.* Br J Pharmacol, 2011. 163(7): p. 1344-64.
41. Crosby, T., et al., *Systemic treatments for metastatic cutaneous melanoma.* Cochrane Database Syst Rev, 2000 (2): p. CD001215.
42. Huncharek, M., J. F. Caubet, and R. McGarry, *Single-agent DTIC versus combination chemotherapy with or without immunotherapy in metastatic melanoma: a meta-analysis of 3273 patients from 20 randomized trials.* Melanoma Res, 2001. 11(1): p. 75-81.
43. Kirkwood, J. M., et al., *Immunotherapy of cancer in 2012.* CA Cancer J Clin, 2012. 62(5): p. 309-35.
44. Kirkwood, J. M., et al., *Next generation of immunotherapy for melanoma.* J Clin Oncol, 2008. 26(20): p. 3445-55.
45. Larkin, J., et al., *Combined vemurafenib and cobimetinib in BRAF-mutated melanoma.* N Engl J Med, 2014. 371 (20): p. 1867-76.
46. Larkin, J., et al., *Combined Nivolumab and Ipilimumab or Monotherapy in Untreated Melanoma.* N Engl J Med, 2015. 373(1): p. 23-34.
47. Wolchok, J. D., et al., *Overall Survival with Combined Nivolumab and Ipilimumab in Advanced Melanoma.* N Engl J Med, 2017. 377(14): p. 1345-1356.
48. Meeth, K., et al., *The YUMM lines: a series of congenic mouse melanoma cell lines with defined genetic alterations.* Pigment Cell Melanoma Res, 2016. 29(5): p. 590-7.
49. Damsky, W. E. and M. Bosenberg, *From bedding to bedside: genetically engineered mouse models of cancer inform concurrent clinical trials.* Pigment Cell Melanoma Res, 2012. 25(4): p. 404-5.

50. Rowland, M., *Influence of route of administration on drug availability*. J Pharm Sci, 1972. 61(1): p. 70-4.
51. Pond, S. M. and T. N. Tozer, *First-pass elimination. Basic concepts and clinical consequences*. Clin Pharmacokinet, 1984. 9(1): p. 1-25.
52. Hartsough, E., Y. Shao, and A. E. Aplin, *Resistance to RAF inhibitors revisited*. J Invest Dermatol, 2014. 134(2): p. 319-325.
53. Cooper, Z. A., et al., *Does It MEK a Difference? Understanding Immune Effects of Targeted Therapy*. Clin Cancer Res, 2015. 21(14): p. 3102-4.
54. Koya, R. C., et al., *BRAF inhibitor veinurafenib improves the antitumor activity of adoptive cell immunotherapy*. Cancer Res, 2012. 72(16): p. 3928-37.
55. Knight, D. A., et al., *Host immunity contributes to the anti-melanoma activity of BRAF inhibitors*. J Clin Invest, 2016. 126(1): p. 402-3.
56. Hugo, W., et al., *Non-genomic and Immune Evolution of Melanoma Acquiring MAPKi Resistance*. Cell, 2015. 162(6): p. 1271-85.
57. Ebert, P. J. R., et al., *MAP Kinase Inhibition Promotes T Cell and Anti-tumor Activity in Combination with PD-L1 Checkpoint Blockade*. Immunity, 2016. 44(3): p. 609-621.
58. Hu-Lieskovan, S., et al., *Improved antitumor activity of immunotherapy with BRAF and MEK inhibitors in BRAF (V600E) melanoma*. Sci Transl Med, 2015. 7(279): p. 279ra41.
59. Dushyanthen, S., et al., *Agonist immunotherapy restores T cell function following MEK inhibition improving efficacy in breast cancer*. Nat Commun, 2017. 8(1): p. 606.
60. Allegrezza, M. J., et al., *IL15 Agonists Overcome the Immunosuppressive Effects of MEK Inhibitors*. Cancer Res, 2016. 76(9): p. 2561-72.
61. Wang, M., et al., *Active immunotherapy of cancer with a nonreplicating recombinant fowlpox virus encoding a model tumor-associated antigen*. J Immunol, 1995. 154(9): p. 4685-92.
62. Wang, M., et al., *Anti-tumor activity of cytotoxic T lymphocytes elicited with recombinant and synthetic forms of a model tumor-associated antigen*. J Immunother Emphasis Tumor Immunol, 1995. 18(3): p. 139-46.

All publications cited in this specification are incorporated herein by reference. U.S. Provisional Patent Application No. 62/802,754, filed Feb. 8, 2019, is incorporated herein by reference. While the invention has been described with reference to particular embodiments, it will be appreciated that modifications can be made without departing from the spirit of the invention. Such modifications are intended to fall within the scope of the appended claims.

What is claimed is:

1. A method for inhibiting progression of lung cancer, colorectal cancer, or melanoma in a subject in need thereof, the method comprising administering to the subject a pharmaceutical composition that is a nanoemulsion comprising:
   i) a single cannabinoid isolate that is a cannabidiol isolate, wherein the cannabidiol isolate is present at a concentration of at least 2% to about 12% w/v;
   ii) at least 2% w/v olive oil;
   iii) water;
   iv) at least 0.05% w/v of polysorbate 80; and
   v) terpenes consisting of about 0.25% w/v of each of limonene, myrcene, pinene, and linalool,
   wherein the subject is being treated with chemotherapy or is recovering from chemotherapy, and the chemotherapy is a platinum-based agent or dacarbazine.

2. The method according to claim 1, wherein the nanoemulsion is characterized by a mean particle diameter size up to 200 nm.

3. The method according to claim 1, wherein the pharmaceutical composition is suitable for or formulated for oral administration.

4. The method according to claim 1, wherein the pharmaceutical composition is suitable for or formulated for topical, oral, or sublingual administration in a solution, spray, drop, strip, cream, or capsule.

5. The method according to claim 1, wherein the melanoma is BRAF-mutant melanoma.

6. The method according to claim 1, wherein the subject received a bone marrow transplant or hematopoietic stem cell transplant.

7. The method of claim 1, wherein the platinum-based agent is carboplatin.

8. The method of claim 1, wherein the subject has a blood cell composition that is not adversely affected by administration of the pharmaceutical composition and/or administration of the pharmaceutical composition does not alter antibody responses to immunization.

9. A method for inhibiting progression of lung cancer, colorectal cancer, or melanoma in a subject in need thereof, the method comprising administering to the subject a pharmaceutical composition that is a nanoemulsion comprising:
   i) a single cannabinoid isolate that is a cannabidiol isolate, wherein the cannabidiol isolate is present at a concentration of about 6% to about 12% w/v;
   ii) about 20% w/v olive oil;
   iii) water;
   iv) about 0.1% w/v of polysorbate-80; and
   v) terpenes consisting of about 0.25% w/v of each of limonene, myrcene, pinene, and linalool.

10. The method according to claim 9, wherein the subject has a blood cell composition that is not adversely affected by administration of the pharmaceutical composition and/or administration of the pharmaceutical composition does not alter antibody responses to immunization.

11. The method according to claim 9, wherein the subject is being treated with chemotherapy or is recovering from chemotherapy, and wherein the chemotherapy is a platinum-based agent or dacarbazine.

12. The method of claim 11, wherein the platinum-based agent is carboplatin.

13. The method according to claim 9, wherein the pharmaceutical composition is suitable for or formulated for oral administration.

14. The method according to claim 9, wherein the pharmaceutical composition is suitable for or formulated for topical, oral, or sublingual administration in a solution, spray, drop, strip, cream, or capsule.

15. The method according to claim 9, wherein the melanoma is BRAF-mutant melanoma.

16. A method for inhibiting progression of lung cancer, colorectal cancer, or melanoma in a subject in need thereof, the method comprising administering to the subject a pharmaceutical composition that is a nanoemulsion comprising:
   i) a single cannabinoid isolate that is a cannabidiol isolate, wherein the cannabidiol isolate is present at a concentration of about 6% w/v;
   ii) about 20% w/v olive oil;
   iii) water;
   iv) about 0.1% w/v of polysorbate-80; and
   v) terpenes consisting of about 0.25% w/v of each of limonene, myrcene, pinene, and linalool.

17. The method according to claim 16, wherein the subject has a blood cell composition that is not adversely affected by administration of the pharmaceutical composition and/or administration of the pharmaceutical composition does not alter antibody responses to immunization.

18. The method according to claim 16, where herein the subject is being treated with chemotherapy or is recovering from chemotherapy.

19. The method according to claim 16, wherein the pharmaceutical composition is suitable for or formulated for oral administration.

20. The method according to claim 16, wherein the melanoma is BRAF-mutant melanoma.

\* \* \* \* \*